United States Patent
Kwak et al.

(10) Patent No.: US 8,747,941 B2
(45) Date of Patent: Jun. 10, 2014

(54) LIQUID CRYSTAL DISPENSING APPARATUS

(75) Inventors: Soo-Min Kwak, Gyeongsangbuk-Do (KR); Hae-Joon Son, Busao (KR)

(73) Assignee: LG Display Co., Ltd., Seoul (KR)

( * ) Notice: Subject to any disclaimer, the term of this patent is extended or adjusted under 35 U.S.C. 154(b) by 1748 days.

(21) Appl. No.: 11/014,237

(22) Filed: Dec. 17, 2004

(65) Prior Publication Data

US 2005/0170072 A1    Aug. 4, 2005

(30) Foreign Application Priority Data

Dec. 17, 2003  (KR) .................. 10-2003-0092717
Sep. 10, 2004  (KR) .................. 10-2004-0072705

(51) Int. Cl.
*B05D 5/00* (2006.01)

(52) U.S. Cl.
USPC ........................................... 427/58

(58) Field of Classification Search
USPC ................... 42/187; 445/25; 427/58
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,430,658 A * | 2/1984 | Fukazawa et al. | 347/81 |
| 4,653,864 A | 3/1987 | Baron | |
| 4,691,995 A | 9/1987 | Yamazaki | |
| 4,775,225 A | 10/1988 | Tsuboyama | |
| 5,247,377 A | 9/1993 | Omeis | |
| 5,263,888 A | 11/1993 | Ishihara | |
| 5,363,132 A * | 11/1994 | Ikkatai | 347/8 |
| 5,379,139 A | 1/1995 | Sato | |
| 5,406,989 A | 4/1995 | Abe | |
| 5,499,128 A | 3/1996 | Hasegawa | |
| 5,507,323 A | 4/1996 | Abe | |
| 5,511,591 A | 4/1996 | Abe | |
| 5,539,545 A | 7/1996 | Shimizu | |
| 5,548,429 A | 8/1996 | Tsujita | |
| 5,642,214 A | 6/1997 | Ishii | |
| 5,680,189 A | 10/1997 | Shimizu | |
| 5,742,370 A | 4/1998 | Kim | |
| 5,757,451 A | 5/1998 | Miyazaki | |
| 5,852,484 A | 12/1998 | Inoue | |
| 5,854,664 A | 12/1998 | Inoue | |
| 5,861,932 A | 1/1999 | Inata | |
| 5,875,922 A | 3/1999 | Chastine | |
| 5,952,676 A | 9/1999 | Sato | |
| 5,956,112 A | 9/1999 | Fujimori | |
| 6,001,203 A | 12/1999 | Yamada | |
| 6,011,609 A | 1/2000 | Kato | |
| 6,016,178 A | 1/2000 | Kataoka | |
| 6,016,181 A | 1/2000 | Shimada | |

(Continued)

FOREIGN PATENT DOCUMENTS

| | | |
|---|---|---|
| CN | 86104087 | 1/1987 |
| CN | 1278656 | 1/2001 |

(Continued)

*Primary Examiner* — Robert Vetere
(74) *Attorney, Agent, or Firm* — McKenna Long & Aldridge, LLP

(57) ABSTRACT

A liquid crystal dispensing method includes loading a substrate onto a stage, aligning at least one liquid crystal dispenser coupled to a guide bar with a dispensing position on the substrate, dispensing liquid crystal material onto the substrate, and unloading the substrate from the stage.

29 Claims, 17 Drawing Sheets

(56) References Cited

U.S. PATENT DOCUMENTS

| | | | |
|---|---|---|---|
| 6,055,035 A * | 4/2000 | von Gutfeld et al. | 349/187 |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 | 10/2001 | Egami | |
| 6,337,730 B1 | 1/2002 | Ozaki | |
| 6,414,733 B1 | 7/2002 | Ishikawa | |
| 6,601,944 B1 * | 8/2003 | Kawazoe | 347/37 |
| 6,712,458 B2 * | 3/2004 | Hatasa et al. | 347/86 |
| 6,782,928 B2 * | 8/2004 | Kweon et al. | 141/192 |
| 2003/0150511 A1 * | 8/2003 | Hashimoto et al. | 141/98 |
| 2003/0172988 A1 * | 9/2003 | Kweon et al. | 141/192 |
| 2003/0180978 A1 * | 9/2003 | Kweon et al. | 438/30 |
| 2004/0011422 A1 * | 1/2004 | Ryu et al. | 141/95 |
| 2004/0241023 A1 * | 12/2004 | Pinkerton et al. | 417/461 |

FOREIGN PATENT DOCUMENTS

| | | |
|---|---|---|
| CN | 1422746 | 6/2003 |
| CN | 1441292 | 9/2003 |
| EP | 1 003 066 A1 | 5/2000 |
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | 04-206514 | 7/1992 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 5/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2001-005401 | 1/2000 |
| JP | 2001-005405 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2001-183683 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-201750 | 7/2001 |
| JP | 2001-209052 | 8/2001 |
| JP | 2001-209056 | 8/2001 |
| JP | 2001-209057 | 8/2001 |
| JP | 2001-209058 | 8/2001 |
| JP | 2001-209060 | 8/2001 |
| JP | 2001-215459 | 8/2001 |
| JP | 2001-222017 | 8/2001 |
| JP | 2001-235758 | 8/2001 |

(56) References Cited

FOREIGN PATENT DOCUMENTS

| | | |
|---|---|---|
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-014360 | 1/2002 |
| JP | 2002-023176 | 1/2002 |
| JP | 2002-049045 | 2/2002 |
| JP | 2002-079160 | 3/2002 |
| JP | 2002-080321 | 3/2002 |
| JP | 2002-082340 | 3/2002 |
| JP | 2002-090759 | 3/2002 |
| JP | 2002-090760 | 3/2002 |
| JP | 2002-107740 | 4/2002 |
| JP | 2002-122870 | 4/2002 |
| JP | 2002-122872 | 4/2002 |
| JP | 2002-122873 | 4/2002 |
| JP | 2002-131762 | 5/2002 |
| JP | 2002-139734 | 5/2002 |
| JP | 2002-156518 | 5/2002 |
| JP | 2002-169166 | 6/2002 |
| JP | 2002-169167 | 6/2002 |
| JP | 2002-182222 | 6/2002 |
| JP | 2002-202512 | 7/2002 |
| JP | 2002-202514 | 7/2002 |
| JP | 2002-214626 | 7/2002 |
| JP | 2002-229042 | 8/2002 |
| JP | 2002-236276 | 8/2002 |
| JP | 2002-258299 | 8/2002 |
| JP | 2002-236292 | 9/2002 |
| JP | 2002-277865 | 9/2002 |
| JP | 2002-277866 | 9/2002 |
| JP | 2002-277881 | 9/2002 |
| JP | 2002-287156 | 10/2002 |
| JP | 2002-296605 | 10/2002 |
| JP | 2002-311438 | 10/2002 |
| JP | 2002-311440 | 10/2002 |
| JP | 2002-311442 | 10/2002 |
| JP | 2002-323687 | 11/2002 |
| JP | 2002-323694 | 11/2002 |
| JP | 2002-333628 | 11/2002 |
| JP | 2002-333635 | 11/2002 |
| JP | 2002-333843 | 11/2002 |
| JP | 2002-341329 | 11/2002 |
| JP | 2002-341355 | 11/2002 |
| JP | 2002-341356 | 11/2002 |
| JP | 2002-341357 | 11/2002 |
| JP | 2002-341358 | 11/2002 |
| JP | 2002-341359 | 11/2002 |
| JP | 2002-341362 | 11/2002 |
| JP | 2002-346452 | 12/2002 |
| KR | 2000-0035302 | 6/2000 |
| KR | 1020020088219 | 11/2002 |

\* cited by examiner

LIQUID CRYSTAL DISPENSING APPARATUS

This application claims the benefit of Korean Patent Application No. 92717/2003, filed on Dec. 17, 2003, and Korean Patent Application No. 72705/2004, filed on Sep. 10, 2004, each of which are hereby incorporated by reference for all purposes as if fully set forth herein.

BACKGROUND OF THE INVENTION

1. Field of the Invention

The present invention relates to a liquid crystal dispensing apparatus. More particularly, the present invention relates to a liquid crystal dispensing apparatus for quickly dispensing liquid crystal material onto predetermined portions of a substrate by mounting a liquid crystal dispenser on a guide bar, capable of moving along a first direction, and by moving the liquid crystal dispenser along a second direction different from the first direction.

2. Discussion of the Related Art

As various portable electric devices such as mobile phones, personal digital assistant (PDA), note book computers, etc., continue to be developed, various types of flat panel display devices such as liquid crystal displays (LCDs), plasma display panels (PDPs), field emission displays (FEDs), and vacuum fluorescent displays (VFDs), having a compact construction, light weight, and low power-consumption characteristics also continue to be developed. Owing to the ease with which they are driven, and to their superior ability to display images, LCDs are extensively used.

FIG. 1 illustrates a cross sectional view of a related art LCD device.

Referring to FIG. 1, a related art LCD device 1 generally comprises a lower substrate 5, an upper substrate 3, and a liquid crystal layer 7 formed therebetween. The lower substrate 5 (i.e., a driving device array substrate) includes a plurality of pixels (not shown), and a driving device (e.g., a thin film transistor (TFT)) and pixel electrode formed at each pixel. The upper substrate 3 (i.e., a color filter substrate) includes a color filter layer for realizing color and a common electrode. An alignment layer is formed on both the lower and upper substrates 5 and 3 to align liquid crystal molecules of the liquid crystal layer 7. The lower substrate 5 and the upper substrate 3 are attached to each other by a sealant material 9, formed at peripheral regions thereof. Accordingly, the liquid crystal layer 7 is confined within an area defined by the sealant material 9.

Light transmittance characteristics of the pixels are controlled by causing the driving devices to generate electric fields between the pixel electrodes and the common electrode. The generated electric fields reorient liquid crystal molecules of the liquid crystal layer 7 to display a picture.

FIG. 2 illustrates a flow chart of a related art method of fabricating the LCD device shown in FIG. 1.

Referring to FIG. 2, the related art method of fabricating the LCD device described above generally consists of three sub-processes: a TFT array substrate forming process; a color filter substrate forming process; and a cell forming process.

At step S101, a TFT array substrate forming process is performed whereby a plurality of gate lines and data lines are formed on the lower substrate 5 (e.g., a glass substrate) to define an array of pixel areas. TFTs are connected to the gate and the data lines within each pixel area and pixel electrodes are connected to the thin film transistors to drive a subsequently provided liquid crystal layer in accordance with a signal applied through the thin film transistor.

At step S104, a color filter process is performed whereby R, G, and B color filter layers, for realizing predetermined colors, and a common electrode are formed on the upper substrate 3 (i.e., a glass substrate).

At steps S102 and S105, alignment layers are formed over the entire surface of both the lower substrate 5 and upper substrate 3, respectively. Subsequently, the alignment layers are rubbed to induce predetermined surface anchoring characteristics (i.e., a pretilt angle and alignment direction) within the liquid crystal molecules of the liquid crystal layer 7.

At step S103, spacers are dispersed onto the lower substrate 5. At step S106, sealant material 9 is printed at peripheral regions of the upper substrate 3. At step S107, the lower and upper substrates 5 and 3 are pressed and bonded together (i.e., assembled) and the spacers dispersed at step S103 ensure that a cell gap formed between the assembled lower and upper substrates 5 and 3 is uniform.

At step S108, the assembled upper and lower substrates 5 and 3 are cut into unit LCD panels. Specifically, the lower substrate 5 and the upper substrate 3 each include a plurality of unit panel areas, within each of which individual TFT array and color filter substrates are formed.

At step S109, liquid crystal material is injected into the cell gap of each of the unit LCD panels through a liquid crystal injection hole defined within the sealant material. After each cell gap is completely filled with liquid crystal material, the liquid crystal injection hole is sealed. At step S110, the filled and sealed unit LCD panels are then tested.

FIG. 3 illustrates a related art liquid crystal injection system for fabricating the related art LCD device.

Referring to FIG. 3, a container 12, containing a supply of liquid crystal material 14, is placed into a vacuum chamber 10 that is connected to a vacuum pump (not shown). Subsequently, a unit LCD panel 1, formed as described above with respect to FIG. 2, is arranged over the container 12 using a unit panel handling device (not shown). Next, the vacuum pump is operated to reduce the pressure within the vacuum chamber 10 to a predetermined vacuum state. The unit panel handling device then lowers the unit LCD panel 1 such that the liquid crystal injection hole 16 contacts a surface of the supply of liquid crystal material 14. After contact is established, liquid crystal material 14 contained within the container 12 can be drawn through the liquid crystal injection hole 16 and into the cell gap of the unit LCD panel 1 due to a capillary effect. The injection method described above, therefore, is generally known as a dipping injection method.

After contact is established, the rate at which the liquid crystal material 14 is drawn into to the cell gap of the unit LCD panel 1 can be increased by pumping nitrogen gas ($N_2$) into the vacuum chamber 10, thereby increasing the pressure within the vacuum chamber 10. As the pressure within the vacuum chamber 10 increases, a pressure differential is created between within the cell gap of the unit LCD panel 1 and the interior of the vacuum chamber 10. Accordingly, more liquid crystal material 14 contained by the container 12 can be injected into the cell gap of the unit LCD panel 1 and at an increased injection rate. As mentioned above, once the liquid crystal material 14 completely fills the cell gap of the unit panel 1, the injection hole 16 is sealed by a sealant and the injected liquid crystal material 14 is sealed within the unit LCD panel 1. The injection method described above, therefore, is generally known as a vacuum injection method.

Despite their usefulness, the aforementioned dipping and vacuum injection method methods can be problematic for several reasons.

First, the total amount of time required to completely fill the cell gap of the unit LCD panel 1 with liquid crystal material 14, according to the dipping/vacuum injection methods, can be relatively long. Specifically, a cell gap thickness of the unit LCD panel 1 is only a few micrometers wide. Therefore, only a small amount of liquid crystal material 14 can be injected into the unit panel 1 per unit time. For example, it can take about 8 hours to completely inject liquid crystal material 14 into the cell gap of a 15-inch unit LCD panel, thereby reducing the efficiency with which LCD devices can be fabricated.

Second, the aforementioned dipping/vacuum injection methods require an excessively large amount of liquid crystal material 14 compared to the relatively small amount of liquid crystal material 14 actually injected into the unit LCD panel 1. Because liquid crystal material 14 contained by the container 12 is exposed to the atmosphere, or certain other process gases during loading and unloading of the unit LCD panel 1 into and out of the vacuum chamber 10, liquid crystal material 14 contained by the container 12 can easily become contaminated. Therefore, the uninjected liquid crystal material 14 must be discarded, thereby reducing the efficiency with which expensive liquid crystal material is used and increasing the cost of fabricating a unit LCD panel 1.

SUMMARY OF THE INVENTION

Accordingly, the present invention is directed to a liquid crystal dispensing apparatus that substantially obviates one or more of the problems due to limitations and disadvantages of the related art.

An advantage of the present invention provides a liquid crystal dispensing apparatus capable of dispensing liquid crystal material directly onto a substrate from which a liquid crystal display (LCD) panel is to be formed, and a dispensing method thereof.

Another advantage of the present invention provides liquid crystal dispensing apparatus capable of quickly dispensing liquid crystal material onto precisely controlled regions of a substrate.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for dispensing liquid crystal on a substrate may, for example, include a frame, a stage coupled to the frame, a guide bar support coupled to the frame, a guide bar coupled to the guide bar support, and at least one liquid crystal dispenser coupled to the guide bar, wherein at least one of the stage, the guide bar support, and the at least one liquid crystal dispenser are moveably coupled to their respective structures along at least one of two directions.

In one aspect of the present invention, at least one liquid crystal dispenser may, for example, include a discharge pump for drawing in liquid crystal material from a container and for discharging the drawn liquid crystal material; and a nozzle in fluid communication with the discharge pump for dispensing the discharged liquid crystal material. In another aspect of the present invention, the discharge pump may, for example, include a cylinder having a suction opening and a discharge opening; and a piston for drawing the liquid crystal material in through the suction opening and for discharging the liquid crystal material out through the discharge opening, wherein the piston is arranged within the cylinder, wherein a groove is arranged in a center region of a lower portion of the piston, and wherein the piston is rotatable and axially translatable within the cylinder.

Further, an apparatus for dispensing liquid crystal on a substrate according to other aspect of this invention, comprising: a frame; a stage coupled to the frame; a guide bar support coupled to the frame; a guide bar coupled to the guide bar support over the stage; and at least one liquid crystal dispenser coupled the guide bar, wherein at least two of the stage, the guide bar support, and the at least one liquid crystal dispenser are moveable with respect to the frame; and a control unit for controlling the movement of the at least two of the stage, the guide bar support, and the at least one liquid crystal dispenser with respect to the frame.

In one aspect of the present invention, the control unit may, for example, include a dispensing amount setting unit for setting a droplet amount and liquid crystal dispensing positions of liquid crystal material; a driving unit for positioning the at least one liquid crystal dispenser at the dispensing position; and a motor driving unit for operating the liquid crystal dispenser to dispense liquid crystal material. In another aspect of the present invention, the driving unit may, for example, include a coordinate calculating unit for receiving the dispensing positions set by the dispensing amount setting unit and for calculating first and second coordinates corresponding to the received dispensing positions. In still another aspect of the present invention, the driving unit may further include a first coordinate driving unit for driving at least one of the guide bar support and the stage along a first direction according to the first coordinate calculated by the coordinate calculating unit. In yet another aspect of the present invention, the driving unit may further include a second coordinate driving unit for driving at least one of the at least one liquid crystal dispenser and the stage along a second direction according to the second coordinate calculated by the coordinate calculating unit.

Still further, a method of dispensing liquid crystal material may, for example, include loading a substrate onto a stage; aligning at least one liquid crystal dispenser over the substrate, wherein at least one liquid crystal dispenser is coupled to a guide bar arranged over the substrate; dispensing liquid crystal material from the aligned at least one liquid crystal dispenser onto the substrate; and unloading the substrate having the liquid crystal material dispensed thereon from the stage. The at least one liquid crystal dispenser may be aligned by, for example, moving at least one of the guide bar along a first direction over the loaded substrate, and at least one liquid crystal dispenser along a second direction over the loaded substrate, wherein the second direction is substantially perpendicular to the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

To resolve problems associated with the aforementioned related art dipping/vacuum injection methods, a liquid crystal dispensing method has been proposed. According to the liquid crystal dispensing method, a liquid crystal layer may be formed by dispensing liquid crystal material directly onto one of the upper or lower substrates. Subsequently, the dispensed liquid crystal material is spread over the substrate upon pressing and bonding the upper and lower substrates together (i.e., assembling the upper and lower substrates). Accordingly, liquid crystal layers may be formed quicker by employing the liquid crystal dispensing method than by employing the related art dipping/vacuum injection methods. Further, the liquid crystal dispensing method consumes less liquid crystal material than either of the related art dipping/vacuum injection methods.

Figure 4:
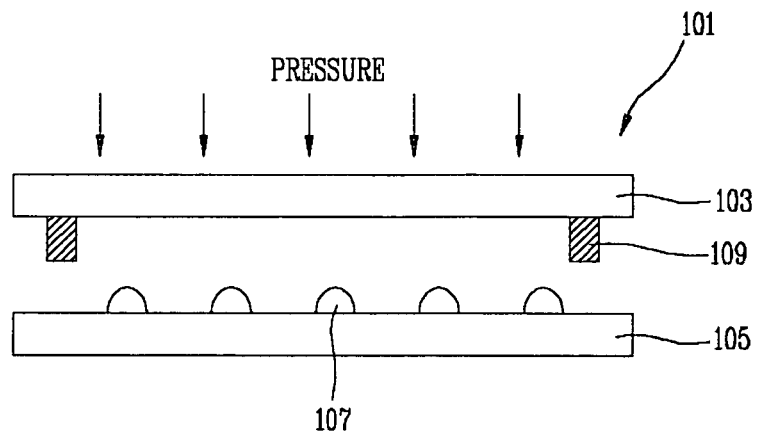
FIG. 4 illustrates a cross sectional view of an LCD device fabricated in accordance with a liquid crystal dispensing method of the present invention.

FIG. 4 illustrates a cross sectional view of an LCD device fabricated by applying the liquid crystal dispensing method.

Referring to FIG. 4, liquid crystal material 107 may be dispensed directly onto one of a lower substrate 105 or an upper substrate 103 prior to assembling the two substrates. In one aspect of the present invention, the lower substrate 105 may include the aforementioned TFT array substrate. In another aspect of the present invention, the upper substrate 103 may include the aforementioned color filter substrate. Sealant material 109 may be applied to peripheral regions of one of the lower or upper substrates 105 or 103, respectively. As mentioned above, the dispensed liquid crystal material 107 spreads between the lower and upper substrates 105 and 103 as the substrates are pressed and bonded together to form an LCD panel 101 having a liquid crystal layer with a substantially uniform thickness.

Figure 5:
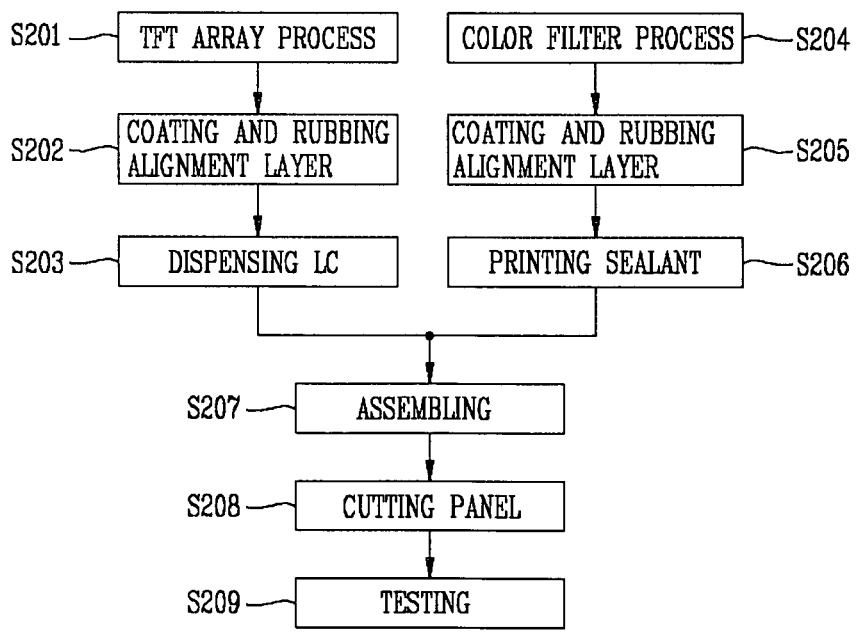
FIG. 5 illustrates a flow chart of a method of fabricating an LCD device according to a liquid crystal dispensing method.

FIG. 5 illustrates a flow chart of a method of fabricating an LCD device according to a liquid crystal dispensing method.

At step S201, an array of driving devices, such as TFTs, may be formed on an lower substrate 105 in a TFT array substrate forming process. In one aspect of the present invention, the TFT array substrate forming process may include steps of forming a plurality of gate lines and data lines on the lower substrate 105 to define an array of pixel areas; connecting TFTs to the gate and the data lines within each pixel area; and connecting pixel electrodes to the TFTs.

At step S204, a color filter layer may be formed on an upper substrate 103 in a color filter substrate forming process. In one aspect of the present invention, the color filter process may include steps of forming R, G, and B color filter layers, for realizing predetermined colors, and a common electrode on the upper substrate 103.

In one aspect of the present invention, the upper and lower substrates 103 and 105, respectively, may be provided as glass substrates having an area of at least about 1000×1200 mm$^2$. It will be appreciated, however, that the upper and lower substrates 103 and 105 may be formed of glass substrates having a smaller area.

At steps S202 and S205, alignment layers may be formed over the entire surface of both the lower and upper substrates. Subsequently, the alignment layers may be imparted with alignment structures via processes such as rubbing, irradiation to predetermined wavelengths of electromagnetic radiation, or the like.

At step S203, liquid crystal material may be dispensed directly onto a unit panel area defined, for example, on the lower substrate 105. At step S206, sealant material 109 may be printed at peripheral regions of a unit panel area defined, for example, on the upper substrate 103. At step S207, the upper and lower substrates 103 and 105 may be aligned and subsequently pressed and bonded together (i.e., assembled). Upon assembling the upper and lower substrates 103 and 105, the dispensed liquid crystal material may be evenly spread between the upper and lower substrates within a region defined by the sealant material.

At step S208, the assembled upper and lower substrates may be cut into a plurality of unit LCD panels. Finally, at step S209, the unit LCD panels may be tested.

In view of the discussion above, fabricating unit LCD panels using the liquid crystal dispensing method is different from fabricating unit LCD panels using the related art dipping/vacuum injection methods.

Figure 1:
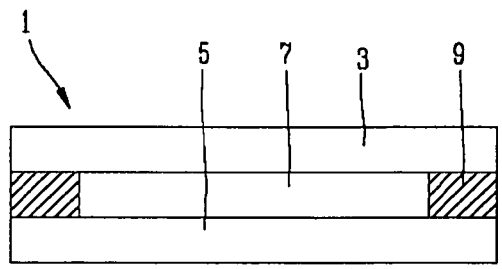
FIG. 1 illustrates a cross sectional view of a related art LCD device.
Figure 2:
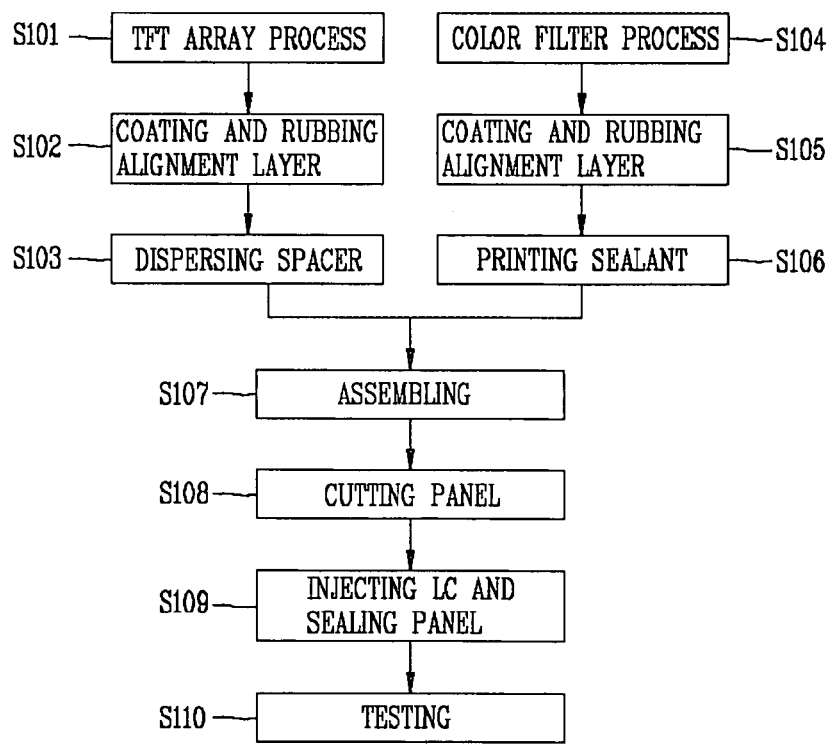
FIG. 2 illustrates a flow chart of a related art method for fabricating the LCD device shown in FIG. 1.
Figure 3:
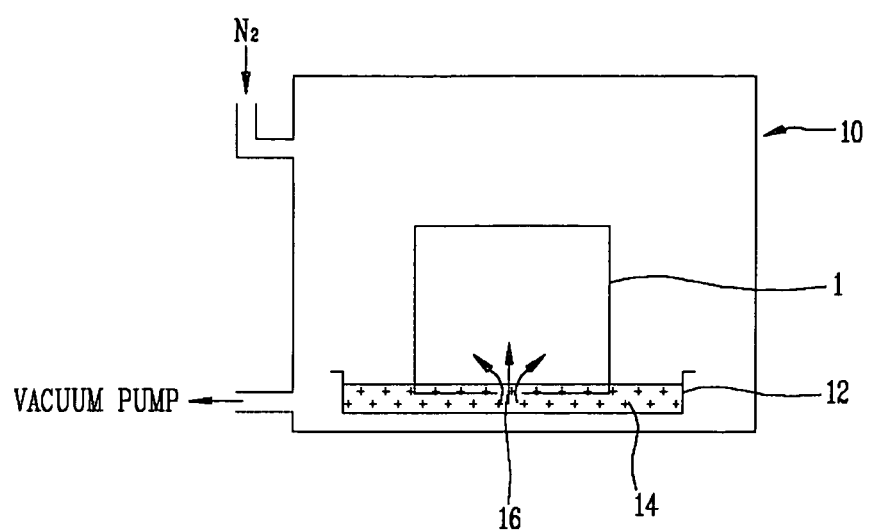
FIG. 3 illustrates a related art liquid crystal injection system for fabricating the related art LCD device.

Specifically, the related art fabrication processes as illustrated in FIG. 2 involve injecting liquid crystal material into a predefined cell gap through a liquid crystal injection hole defined within sealant material followed by sealing the liquid crystal injection hole. Although not shown in FIG. 2, upon injecting the liquid crystal material 14 into the cell gap of the unit panel 1 (see FIG. 3), outer surfaces of the unit LCD panel 1 contact liquid crystal material 14 contained within the container 12 and must be washed after the cell gap is completely filled with liquid crystal material 14.

The liquid crystal dispensing processes illustrated in FIG. 5, however, involve dispensing liquid crystal material directly onto a substrate, thereby eliminating the need to form any seal or liquid crystal injection hole. Moreover, because the liquid crystal material is dispensed directly onto the substrate, outer surfaces of a subsequently LCD panel need not be washed to remove liquid crystal material. Accordingly, LCD panels may be fabricated more simply using the liquid crystal dispensing method than using the related art dipping/vacuum injection methods. Further, the liquid crystal dispensing method has a higher yield than the related art dipping/vacuum injection methods.

To fabricate LCD panels using the liquid crystal dispensing method, dispensing positions (i.e., positions on a substrate where droplets of liquid crystal material are to be dispensed) and droplet amounts (e.g., amounts of liquid crystal material within each droplet of liquid crystal material) heavily influence the formation of a liquid crystal layer having a desired thickness. Because the thickness of a liquid crystal layer is closely related to, for example, the volume of the cell gap of the LCD panel, dispensing positions and droplet amounts must be controlled precisely to avoid fabricating a defective LCD panel. Accordingly, the principles of the present invention provide a liquid crystal dispensing dispenser that ensures that actual dispensing positions and droplet amounts are precisely controlled to match predetermined dispensing positions and droplet amounts.

Figure 6:
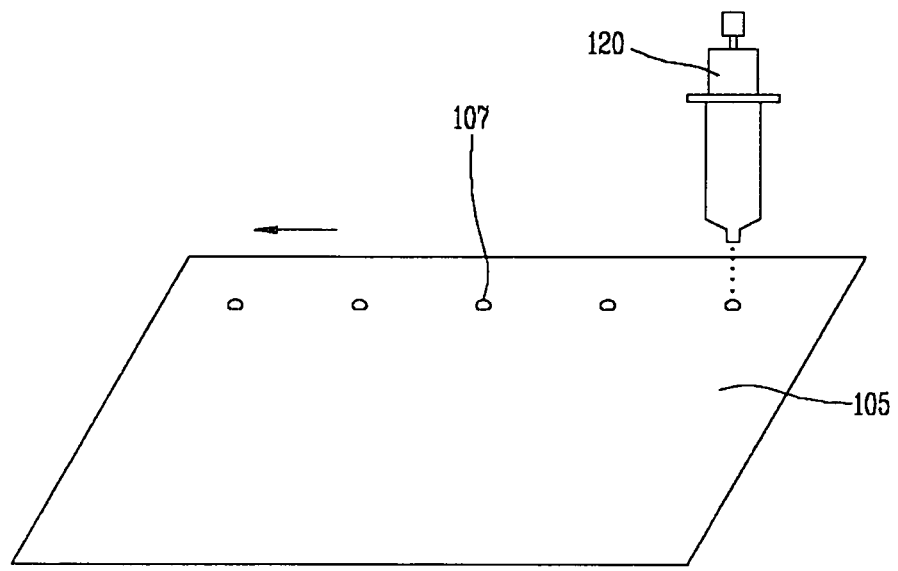
FIG. 6 illustrates a liquid crystal dispensing method.

FIG. 6 illustrates a liquid crystal dispensing method in accordance with principles of the present invention.

Referring to FIG. 6, a liquid crystal dispenser may be arranged above the lower substrate 105 (e.g., a glass substrate). Further, droplets of liquid crystal material 107 may be dispensed from the liquid crystal dispenser 120.

Figure 7:
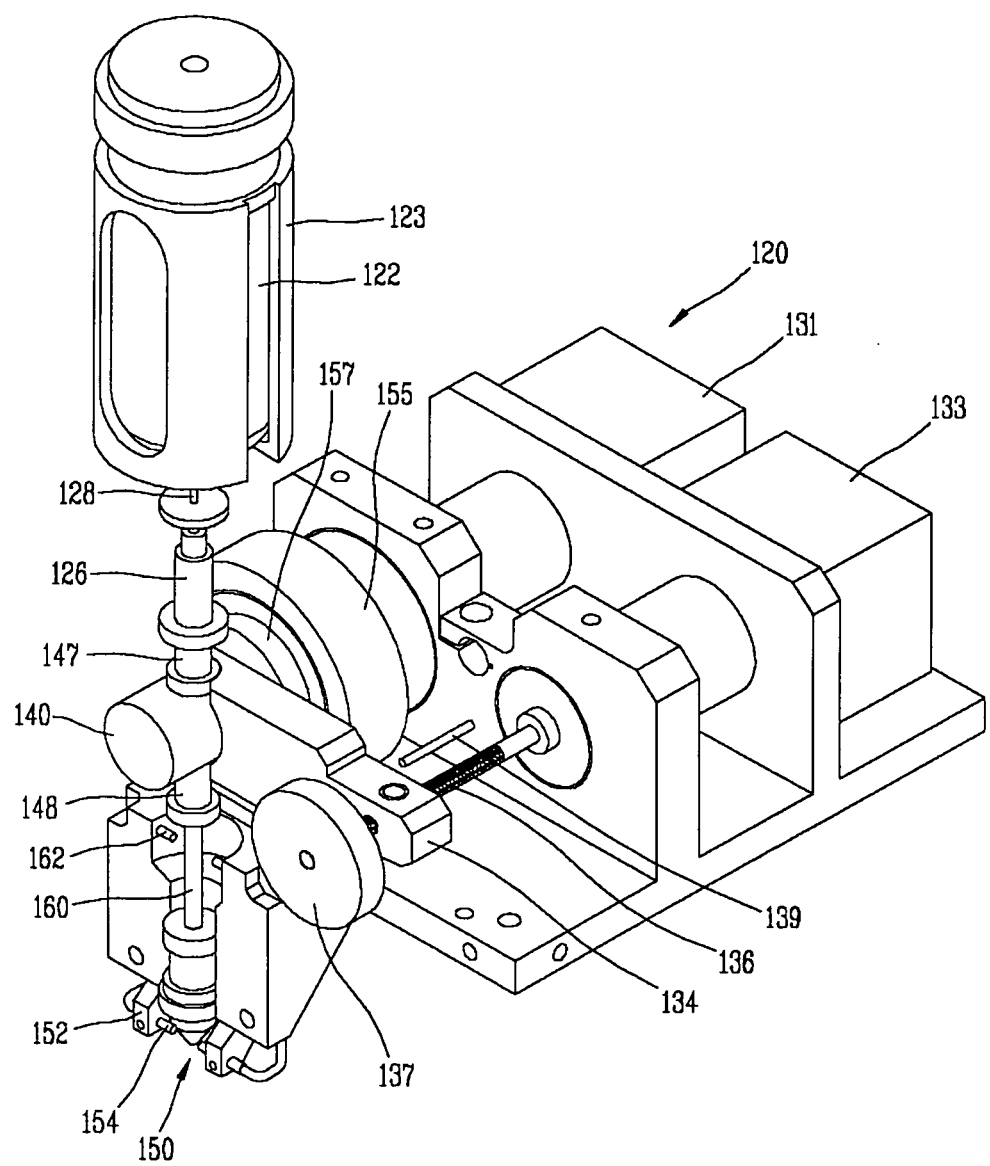
FIG. 7 illustrates a perspective view of a liquid crystal dispenser according to principles of the present invention.
Figure 8:
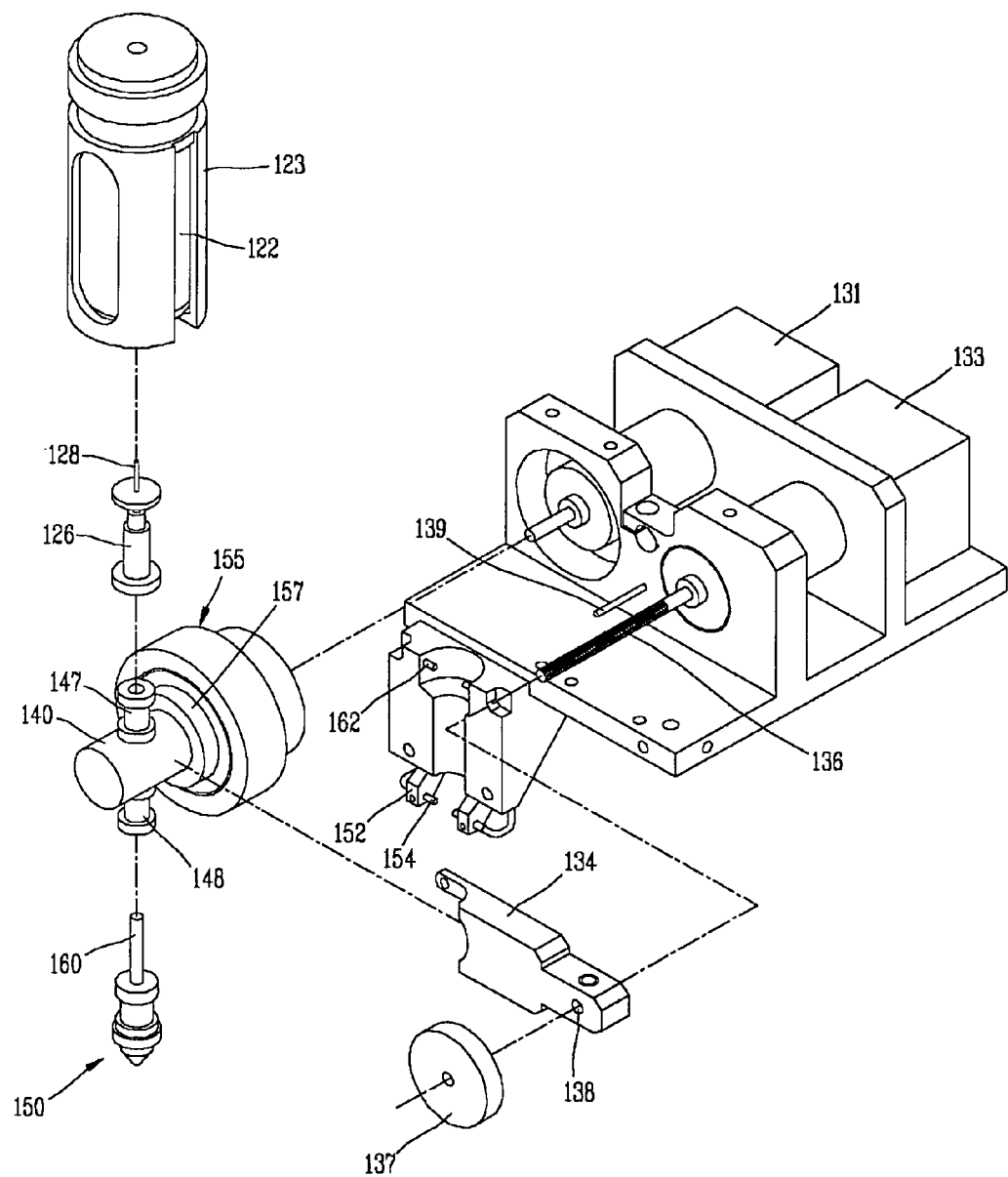
FIG. 8 illustrates an exploded perspective view of the liquid crystal dispenser shown in FIG. 7.

FIG. 7 illustrates a perspective view of a liquid crystal dispenser according to principles of the present invention. FIG. 8 illustrates an exploded perspective view of the liquid crystal dispenser shown in FIG. 7.

Referring to FIGS. 7 and 8, the liquid crystal dispenser 120 of the present invention may, for example, include a container 122 that contains liquid crystal material. Accordingly, the liquid crystal droplets 107 may, for example, be dispensed from liquid crystal material contained within the container 122.

In one aspect of the present invention, the container 122 may, for example, be cylindrically shaped. In another aspect of the present invention, the container 122 may be formed of an easily deformable material (e.g., polyethylene, or the like).

According to principles of the present invention, the liquid crystal droplets may be imprecisely dispensed onto a substrate if the container 122 deforms during the dispensing. Accordingly, the container 122, provided as described above, may be accommodated within a case 123, wherein the case 123 may, for example, be formed of a material that is relatively difficult to deform compared to the material from which the container 122 is formed (e.g., stainless steel, or the like). Alternatively, the container 122 itself may be formed of a material that does not easily deform (e.g., stainless steel, or the like) and the necessity of the case 123 may be eliminated altogether, thereby reducing the complexity and overall cost of the liquid crystal dispenser 120.

In one aspect of the present invention, the container 122 may be formed of a material that is substantially inert with respect to the liquid crystal material (e.g., polyethylene, or the like). In another aspect of the present invention, however, the container 122 may be formed of any structurally suitable material and the interior walls of the container 122 may be coated with a material such as a fluorine resin to prevent liquid crystal material contained therein from chemically reacting with sidewalls of the container 122.

A gas supply tube (not shown) may be arranged at an upper portion of the container 122 to transport an inert gas (e.g., nitrogen) into portions of the container 122 that are not occupied by the liquid crystal material contained therein. In one aspect of the present invention, the gas may be used to pressurize the container 122, facilitating the liquid crystal material contained therein to be dispensed onto the substrate.

According to principles of the present invention, a liquid crystal discharge pump 140 may be arranged at a lower portion of the container 122. The liquid crystal discharge pump 140 may be used to discharge predetermined amounts of liquid crystal material, contained within the container 122, onto a substrate. Therefore, a liquid crystal suction opening 147 may, for example, be formed at an upper portion of the liquid crystal discharge pump 140 and a liquid crystal discharge opening 148 may, for example, be formed at a lower portion of the liquid crystal discharge pump 140. During an operation of the liquid crystal dispenser 120, the liquid crystal suction opening 147 may, for example, convey liquid crystal material drawn from the container 122 into the liquid crystal discharge pump 140. Similarly, during an operation of the liquid crystal dispenser 120, the liquid crystal discharge opening 148 may, for example, convey liquid crystal material discharged from the liquid crystal discharge pump 140 to a nozzle 150.

According to principles of the present invention, a first connecting tube 126 may be coupled to the liquid crystal suction opening 147. In one aspect of the present invention, the liquid crystal suction opening 147 may be coupled to the first connecting tube 126 by being inserted into the first connecting tube 126. In another aspect of the present invention, the liquid crystal suction opening 147 may be coupled to the first connecting tube 126 via a coupling means (e.g., a screw, or the like). In still another aspect of the present invention, the liquid crystal suction opening 147 may be integrally formed with the first connecting tube 126.

According to principles of the present invention, a hollow pin 128 (e.g., an injection needle) may be formed at one side of the first connecting tube 126 and a pad (not shown), formed of a highly compressible material and capable of forming a hermetic seal (e.g., silicon, butyl rubber material, or the like), may be arranged at a lower portion of the container 122. According to principles of the present invention, the pin 128 may be inserted through the pad and into the container 122. Upon insertion of the pin 128, the pad presses against the outside wall the pin 128, preventing liquid crystal material from leaking outside of the pin 128, and liquid crystal material contained within the container 122 may be transported into the liquid crystal suction opening 147. Because the liquid crystal suction opening 147 and the container 122 are coupled to each other via the pin/pad structure discussed above, the liquid crystal suction opening 147 may be simply coupled and decoupled to the container 122.

According to principles of the present invention, the nozzle 150 may be connected to the liquid crystal discharge opening 148 via a second connecting tube 160 to facilitate the dispensing of liquid crystal material discharged from the liquid crystal discharge pump 140 onto the substrate. In one aspect of the present invention, the second connecting tube 160 may be formed of an opaque material. However, liquid crystal material contained within the liquid crystal material container 122 may, at some point, contain vapor (e.g., in the form of bubbles). For example, vapor may be introduced into the liquid crystal material at the liquid crystal discharge pump 140. The presence and amount of vapor cannot precisely controlled nor can it be completely removed before the liquid crystal material is dispensed onto the substrate, even if a vapor removing device is employed. When the liquid crystal material contains vapor, the dispensing positions and droplet amounts cannot be precisely controlled and a defective LCD panel can be potentially fabricated. Therefore, one way to prevent the dispensing positions and droplet amounts from being imprecisely controlled is to stop the operation of the liquid crystal dispenser as soon as it is determined that vapor is present. Accordingly, and in an alternative aspect of the present invention, the second connecting tube 160 may be formed of a suitably transparent material, enabling a suitable visual inspection to determine the presence of vapor contained within the liquid crystal material and ensuring that dispensing positions and droplet amounts may be precisely controlled. A first sensor 162 (e.g., a photo coupler, or the like) may be arranged at opposing sides of the second connecting tube 160 to detect the presence of vapor within the discharged liquid crystal material.

According to principles of the present invention, a protection unit 152 may be arranged at a lower portion of the nozzle 150 to protect opposing sides of the nozzle 150 from external stresses, etc. Further, a second sensor 154 may be arranged at the protection unit 152 to detect the presence of vapor within the liquid crystal material dispensed from the nozzle 150 and/or to detect the presence of liquid crystal material accumulated on the surface of the nozzle 150 (i.e., residual liquid crystal material). In one aspect of the present invention, the second sensor 154 may be provided as, for example, a photo coupler, or the like.

The liquid crystal dispenser according to the principles of the present invention is capable of precisely controlling the amount of liquid crystal material dispensed through a nozzle 150 and onto a substrate by varying a fixation angle of the liquid crystal discharge pump 140 and by driving the liquid crystal discharge pump 140. However, the actual amount of liquid crystal material dispensed within each liquid crystal droplet may deviate from a predetermined amount when residual liquid crystal material is accumulated on the surface of the nozzle 150. Usually, the residual liquid crystal material is accumulated because the nozzle 150 is formed of a metal such as stainless steel. Stainless steel has a high wetability (i.e., has a high surface energy/is highly hydrophilic) with respect to liquid crystal material. Therefore, the contact angle (i.e., the angle formed when a liquid is in thermodynamic equilibrium with the surface of a solid) formed between the nozzle 150 and the liquid crystal material is low and, therefore, liquid crystal material spreads over the surface of nozzle 150. Because the liquid crystal material spreads over the nozzle 150, the amount of liquid crystal material actually dispensed onto the substrate as a liquid crystal droplet is less than the predetermined amount, increasing the likelihood of defectively fabricating an LCD panel. Moreover, as the dispensing operation is repeated, portions of the accumulated residual liquid crystal material may be dispensed with liquid crystal material discharged from the liquid crystal discharge pump 140, causing the amount of liquid crystal material actually dispensed onto the substrate as a droplet to be greater than the predetermined droplet amount and, again increasing the likelihood of defectively fabricating an LCD panel.

Therefore, to reduce the accumulation of residual liquid crystal material on the surface of the nozzle 150, a material having a low wetability (i.e., a low surface energy/highly hydrophobic) with respect to the liquid crystal material and forming a large contact angle with liquid crystal material (e.g., fluorine resin, or the like), may be deposited on the surface of the nozzle 150 by any suitable method (e.g., dipping, spraying, or the like). Alternatively, the nozzle 150 may be completely formed from the material having a low wetability with respect to the liquid crystal material (e.g., fluorine resin, or the like). Such a nozzle 150 may thus be used once or multiple times. By providing the nozzle 150 with the material having the low wetability, less liquid crystal material may spread over the surface of the nozzle 150 and more liquid crystal material may be dispensed onto the substrate through the nozzle 150. As a result, the amount of liquid crystal material actually dispensed onto the substrate as a liquid crystal droplet may be substantially equal to the predetermined amount.

Either alternatively or supplementarily to providing nozzle 150 with the material having the low wetability, as described above, the nozzle 150 may be cleaned after a predetermined amount of time has elapsed, after a predetermined amount of liquid crystal material has been dispensed through the nozzle 150, and/or after liquid crystal material has been dispensed onto a predetermined number of LCD panel regions of at least one base substrate. In one aspect of the present invention, the nozzle 150 may be cleaned by blowing a suitable gas (e.g., air, $N_2$, etc.) against the surface of the nozzle 150 at a velocity sufficient to remove the residual liquid crystal material accumulated at the end of the nozzle 150. In another aspect of the present invention, the cleaning may, for example, include performing a dummy-dispensing operation wherein liquid crystal material is dispensed, for example, onto a dummy region of the base substrate (e.g., a region of the base substrate outside the LCD panel regions). By performing the dummy-dispensing operation, the force of newly dispensed liquid crystal material may dislodge the residual liquid crystal material accumulated at the end of the nozzle 150 to remove the residual liquid crystal material from the end of the nozzle 150.

According to principles of the present invention, the liquid crystal discharge pump 140 may be coupled to (e.g., inserted into) a rotating member 157. The rotating member 157 may be fixed to a fixing unit 155 and coupled to a first motor 131. Therefore, as the first motor 131 is operated, the rotating member 157 rotates which, in turn, causes the liquid crystal discharge pump 140 to dispense liquid crystal material contained within the liquid crystal container 122 onto a substrate.

According to principles of the present invention, the amount of liquid crystal material discharged from the liquid crystal material container 122 via the liquid crystal discharge pump 140 may be varied in accordance with a fixation angle between the liquid crystal discharge pump 140 and the rotating member 157 (i.e., the angle at which a portion of the liquid crystal discharge pump 140 is fixed to the rotating member 157). Therefore, the liquid crystal discharge pump 140 may, for example, contact a first end of a bar shaped liquid crystal capacity amount controlling member 134. A hole 138 may be formed at a second end of the liquid crystal capacity amount controlling member 134 and a rotational shaft 136 may be inserted into the hole 138. A first end of the rotational shaft 136 may be connected to a second motor 133 and a second end of the rotational shaft 136 may be connected to an angle controlling lever 137. The rotational shaft 136 may be rotated either automatically upon driving the second motor 133 or manually upon operating the angle controlling lever 137. A screw (not shown) may be formed at a periphery of the hole 138 and the rotational shaft 136 so as to couple the liquid crystal capacity amount controlling member 134 to the rotational shaft 136. Upon rotating the rotational shaft 136, the second end of the liquid crystal capacity amount controlling member 134 may move along a linear axis of the rotational shaft 136, wherein the direction of the rotating determines the direction in which the second end of the liquid crystal capacity amount controlling member 134. As a result of the movement of the second end of the liquid crystal capacity amount controlling member 134, the fixation angle may be varied.

Accordingly, the first motor 131 may operate to cause the liquid crystal discharge pump 140 to dispense liquid crystal material from the liquid crystal material container 122 onto the substrate while the second motor 133 may operate to control the fixation angle and thus to control the amount of liquid crystal material dispensed by the liquid crystal discharge pump 140 during its operation.

According to principles of the present invention, individual amounts of liquid crystal material dispensed within each droplet are very minute. Further, variations in the droplet amounts are also very minute. Therefore, minute variations in the fixation angle must be precisely controlled. To effect such precise control in the fixation angle, the second motor 133 may be provided as a step motor operated by a pulse input value, a servo motor, or the like.

Figure 9A:
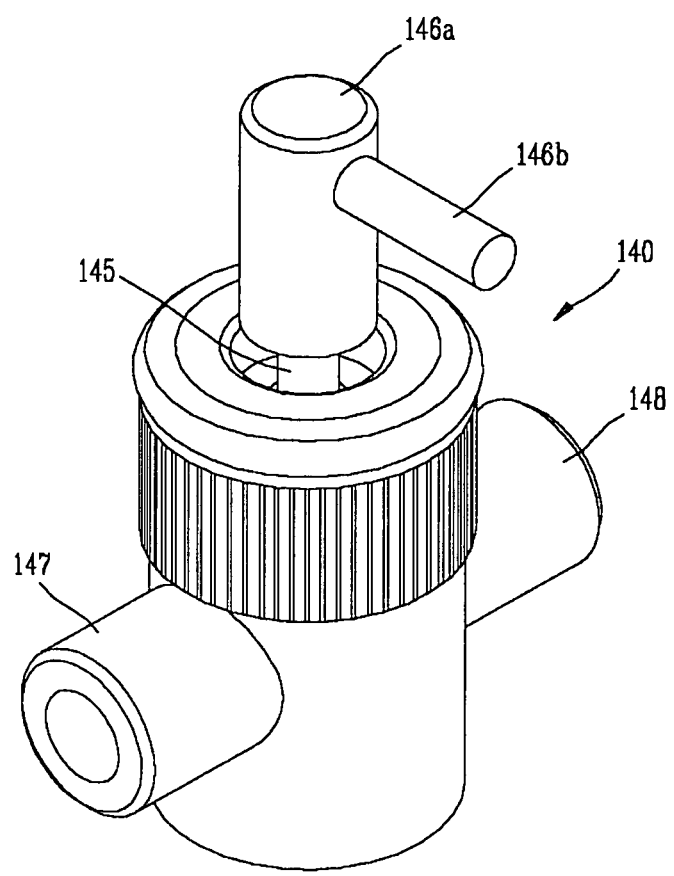
FIG. 9A illustrates a perspective view of a liquid crystal discharge pump of the liquid crystal dispenser according to principles of the present invention.
Figure 9B:
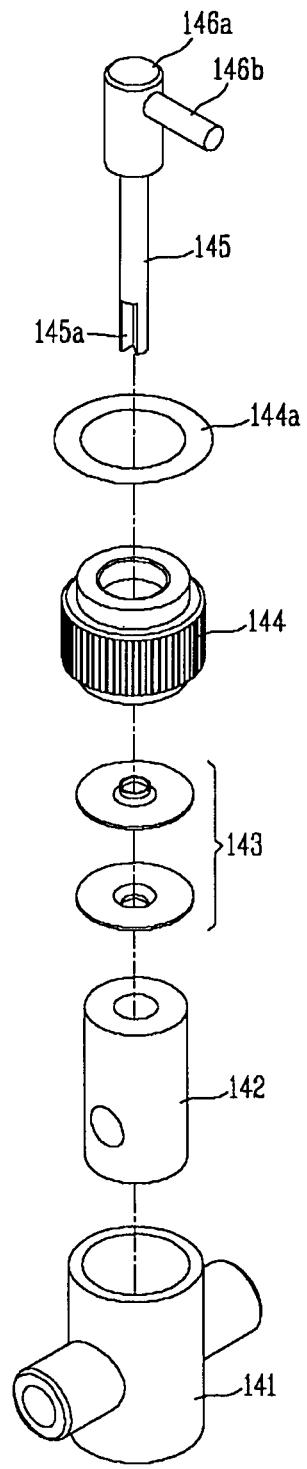
FIG. 9B illustrates an exploded perspective view of the liquid crystal discharge pump shown in FIG. 9A.

FIG. 9A illustrates a perspective view of a liquid crystal discharge pump of the liquid crystal dispenser according to principles of the present invention. FIG. 9B illustrates an exploded perspective view of the liquid crystal discharge pump shown in FIG. 9A.

Referring to FIGS. 9A and 9B, the liquid crystal discharge pump 140 of the present invention may, for example, include a case 141, wherein the case 141 includes the liquid crystal suction and discharge openings 147 and 148, respectively; a cap 144 coupled to the case 141, wherein an upper portion of the cap 144 includes an opening; a cylinder 142 arranged within the case 141 for conveying liquid crystal material drawn from the container 122; a sealing means 143 for sealing the cylinder 142; an o-ring 144a arranged at an upper portion of the cap 144 for preventing liquid crystal material from leaking outside the liquid crystal discharge pump 140; a piston 145 arranged within the cylinder 142 through the opening of cap 144, the piston 145 being rotatable and axially translatable within the cylinder 142 (e.g., along the vertical axis as illustrated in FIGS. 9A and 9B) for drawing in and discharging liquid crystal material through the liquid crystal suction opening 147 and the liquid crystal discharge opening 148, respectively; a head 146a arranged at an upper portion of the piston 145 and fixed to the rotating member 157; and a bar 146b arranged at the head 146a. In one aspect of the present invention, the bar 146b may be inserted within a hole (not shown) of the rotating member 157. Accordingly, the piston 145 may rotate when the rotating member 157 is rotated by the first motor 131.

Referring to FIG. 9B, a groove 145a may be formed at an end portion of the piston 145. In one aspect of the present invention, the groove 145a may occupy no more than about 25% of a cross-sectional area of the piston 145. In another aspect of the present invention, the groove 145a may open and close the liquid crystal suction opening 147 and the liquid crystal discharge opening 148 upon rotating the piston 145 to draw in and discharge liquid crystal material through the liquid crystal suction opening 147 to the liquid crystal discharge opening 148.

An exemplary operation of the liquid crystal discharge pump 140 will now be explained in greater detail below with reference to FIG. 10.

Figure 10:
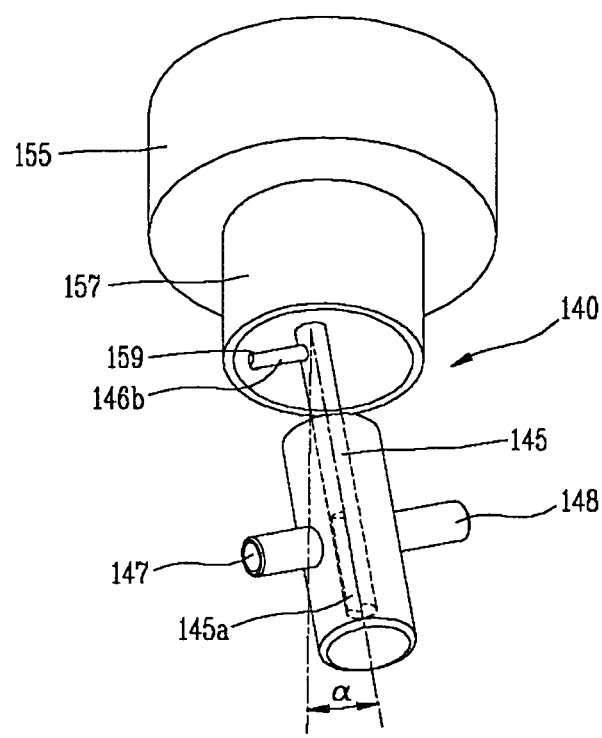
FIG. 10 illustrates a view of the liquid crystal discharge pump fixed to a rotating member at a fixation angle.

Referring to FIG. 10, the piston 145 of the liquid crystal discharge pump 140 may be fixed to the rotating member 157 at a predetermined angle, α (i.e., the fixation angle). For example, the bar 146b formed at the piston head 146a may be inserted into a hole 159 formed within the rotating member 157 to fix the piston 145 to the rotating member 157. Because the bar 146b is fixed within the hole 159, the piston 145 rotates as the rotating member 157 rotates. A bearing (not shown) may be provided within the hole 159 to allow the bar 146b of the piston 145 to move in back and forth and right and left directions with respect to the hole 159. Upon operating the first motor 131, the rotating member 157 may be rotated while the piston 145 may also be rotated and axially translated within the cylinder 142.

If the fixation angle (α) is 0°, the piston 145 rotates only about the axis of the rotating member 157. However, if the fixation angle (α) of the piston 145 is substantially not 0°, the piston 145 may rotate about an off-axis angle with respect to the rotating member 157 (e.g., transverse and longitudinal rotation) and may also move along the axis of the cylinder 142.

For example, the piston 145 may be rotated a predetermined amount within an interior space of the cylinder 142 to allow liquid crystal material within the liquid crystal suction opening 147 to be drawn into the cylinder 142. Upon rotating the piston 145 within the cylinder 142 further, liquid crystal material drawn into the cylinder 142 may be discharged into the liquid crystal discharge opening 148. To facilitate the aforementioned drawing-in (or suction) and discharge operations, the groove 145a may be selectively arranged to be in fluid communication with the liquid crystal suction and discharge openings 147 and 148, as will be discussed in greater detail with respect to FIGS. 11A to 11D.

Figure 11A:
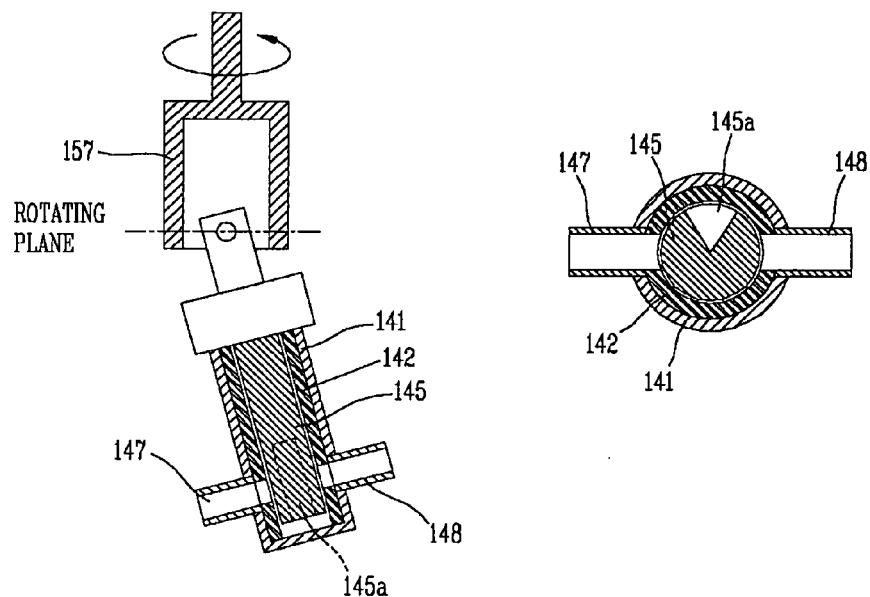
FIGS. 11A to 11D illustrate operational views of the liquid crystal discharge pump according to principles of the present invention.
Figure 11B:
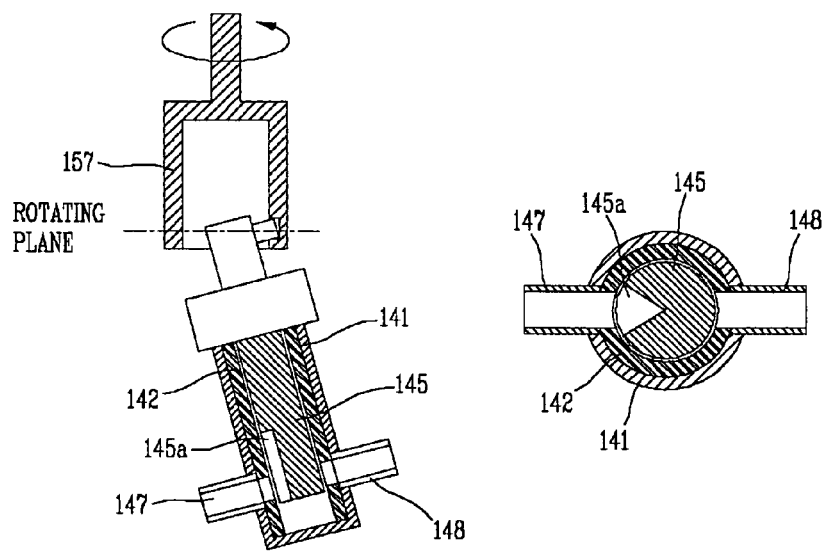
Figure 11C:
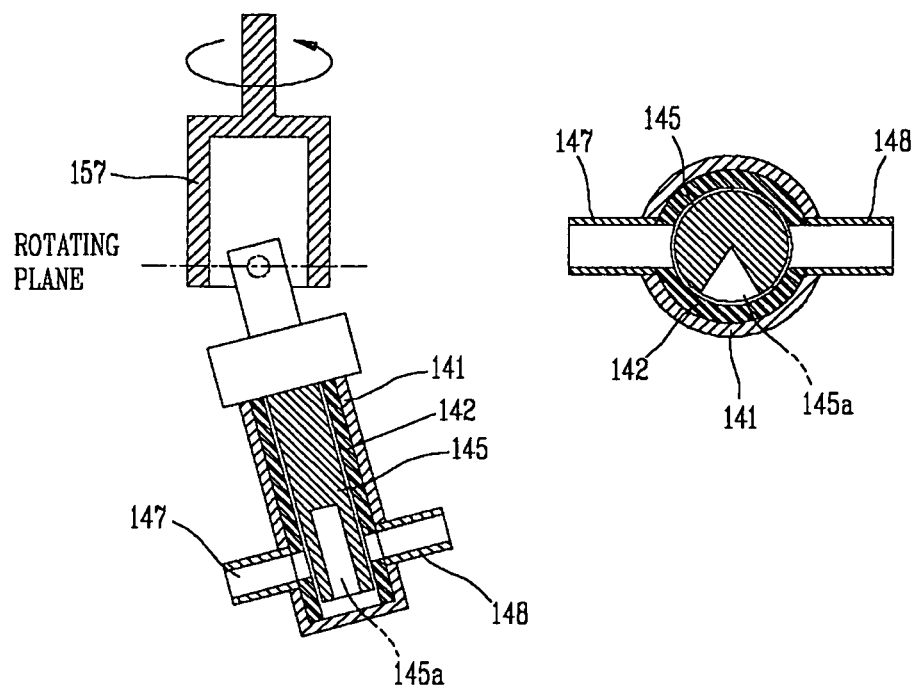
Figure 11D:
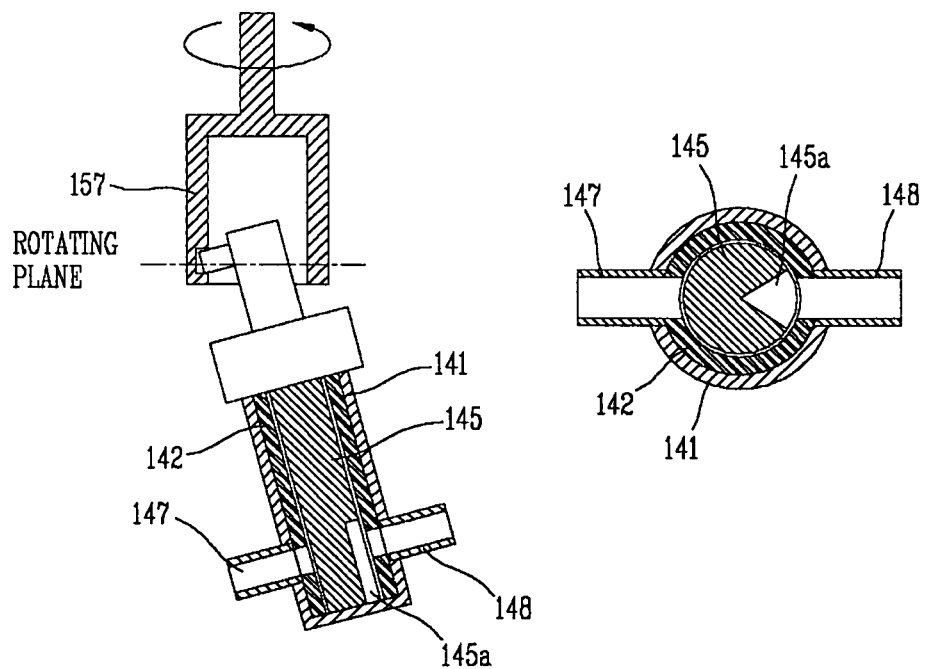

Referring generally to FIGS. 11A to 11D, liquid crystal material contained within the liquid crystal material container 122 is discharged to the nozzle 150 through four strokes of the liquid crystal discharge pump 140. FIGS. 11A and 11C illustrate cross strokes, FIG. 11B illustrates a suction stroke at the liquid crystal suction opening 147, and FIG. 11D illustrates a discharge stroke at the liquid crystal discharge opening 148.

Referring specifically to FIG. 11A, the piston 145, fixed to the rotating member 157 at the fixation angle (α), rotates in accordance with the rotation of the rotating member 157. In the cross stroke shown in FIG. 11A, both the liquid crystal suction opening 147 and the liquid crystal discharge opening 148 are closed by the piston 145.

Upon rotating the rotating member 157 approximately 45°, the piston 145 rotates within the cylinder 142 to arrange the groove 145a to be in fluid communication with the liquid crystal suction opening 147, as shown in FIG. 11B. Because the piston 145 is fixed to the rotating member 157 at a predetermined fixation angle, the bar 146b rotates along the plane in which the rotating member 157 rotates while the piston 145 moves axially out of the cylinder 142 and rotates within the cylinder 142 to arrange the groove 145a in fluid communication with the liquid crystal suction opening 147. Upon arranging the groove 145a to be in fluid communication with the liquid crystal suction opening 147, liquid crystal material within the liquid crystal suction opening 147 is drawn into the cylinder 142 and groove 145a. The suction stroke illustrated in FIG. 11B, arranging the groove 145a in fluid communication with the liquid crystal suction opening 147, thus 'opens' the liquid crystal suction opening 147.

Upon further rotating the rotating member 157 approximately 45°, the piston 145 rotates within the cylinder 142 to arrange the groove 145a between the liquid crystal suction and discharge openings 147 and 148, as shown in FIG. 11C. The cross stroke illustrated in FIG. 11C, arranging the groove 145a between the liquid crystal suction and discharge openings 147 and 148, thus 'closes' the liquid crystal suction opening 147.

Upon further rotating the rotating member 157 approximately 45°, the piston 145 moves axially into the cylinder 142 and rotates within the cylinder 142 to arrange the groove 145 to be in fluid communication with the liquid crystal discharge opening 148, as shown in FIG. 11D. Upon arranging the groove 145a to be in fluid communication with the liquid crystal discharge opening 148, liquid crystal material is discharged from the cylinder 142 and groove 145a into the liquid crystal discharge opening 148. The discharge stroke illustrated in FIG. 11D, arranging the groove 145a to be in fluid communication with the liquid crystal discharge opening 148, thus 'opens' the liquid crystal discharge opening 148.

As described above, the liquid crystal discharge pump 140 repeats four consecutive strokes (i.e., the first cross stroke, the suction stroke, the second cross stroke, and the discharge stroke), to discharge the liquid crystal material, contained in the liquid crystal material container 122, to the nozzle 150. According to principles of the present invention, the amount of liquid crystal material discharged by the liquid crystal discharge pump 140 may be varied according to the fixation angle, $\alpha$, regulating the degree to which the piston 145 rotates off the axis of the rotating member 157 and thus regulating the degree to which the piston 145 moves along the axis of the cylinder 142.

Figure 12:
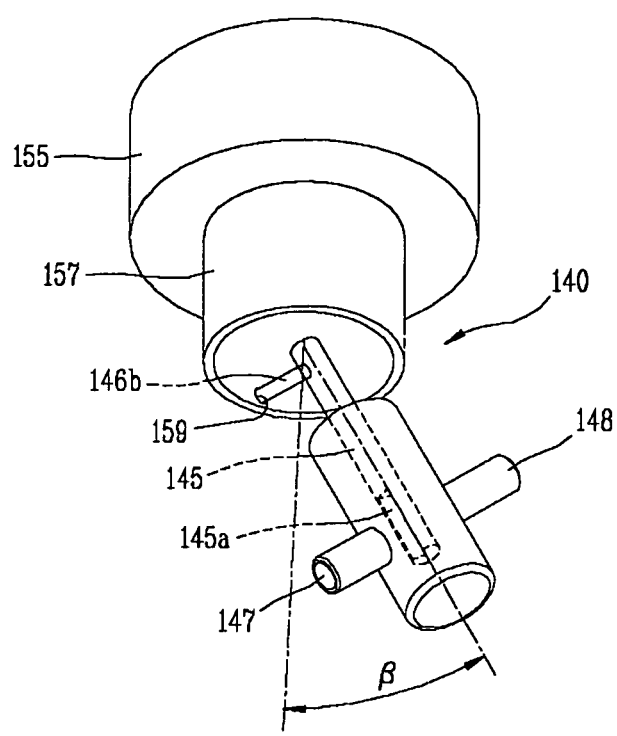
FIG. 12 illustrates a view of the liquid crystal discharge pump fixed to a rotating member at an increased fixation angle.

FIG. 12 illustrates a view the liquid crystal discharge pump fixed to the rotating member at a predetermined angle $\beta$.

As described above with respect to FIG. 10, the liquid crystal discharge pump 140 shown in FIG. 10 may be fixed to the rotating member 157 at a fixation angle $\alpha$. However, as shown in FIG. 12, the liquid crystal discharge pump 140 may be fixed to the rotating member 157 at a fixation angle of $\beta$, wherein $\beta > \alpha$. Accordingly, the degree of off-axis rotation of piston 145, with respect to the rotating member 157 shown in FIG. 12 may be greater than the degree of off-axis rotation of piston 145 shown in FIG. 10. Accordingly, as the fixation angle increases, the degree to which the piston 145 is axially translated along the axis of the cylinder 142 increases, thereby increasing the amount of liquid crystal material that may be drawn into, and discharged from, the cylinder 142 per revolution of the rotating member 157.

Therefore, the principles of the present invention allow the amount of liquid crystal material discharged to be controlled by adjusting the fixation angle. In one aspect of the present invention, the fixation angle may be controlled by the liquid crystal capacity amount controlling member 134 shown in FIG. 7. In another aspect of the present invention, the liquid crystal capacity amount controlling member 134 may be moved by driving the second motor 133. Therefore, the fixation angle may be controlled by adjusting the second motor 133. Alternatively, the fixation angle may be controlled by manually adjusting the angle controlling lever 137.

In one aspect of the present invention, the fixation angle of the liquid crystal discharge pump 140 may be measured by a sensor 139. In another aspect of the present invention, the sensor 139 may include a linear variable differential transformer. Accordingly, if the fixation angle exceeds a predetermined angle, the sensor 139 may communicate an alarm to a user, preventing the liquid crystal discharge pump 140 from being damaged.

According to principles of the present invention, the liquid crystal dispenser 120 described above may dispense liquid crystal material directly onto an LCD panel region of a base substrate as a plurality of liquid crystal droplets. As used herein, the term "LCD panel region" indicates the particular area of a base substrate from which an LCD panel will be eventually formed. Accordingly, a plurality of LCD panel regions may be formed on the same base substrate. Therefore, the principles of the present invention provide a liquid crystal dispensing apparatus including a plurality of the above-described liquid crystal dispensers 120 to increase the efficiency with which liquid crystal material is dispensed onto LCD panel regions formed on the same base substrate.

Figure 13:
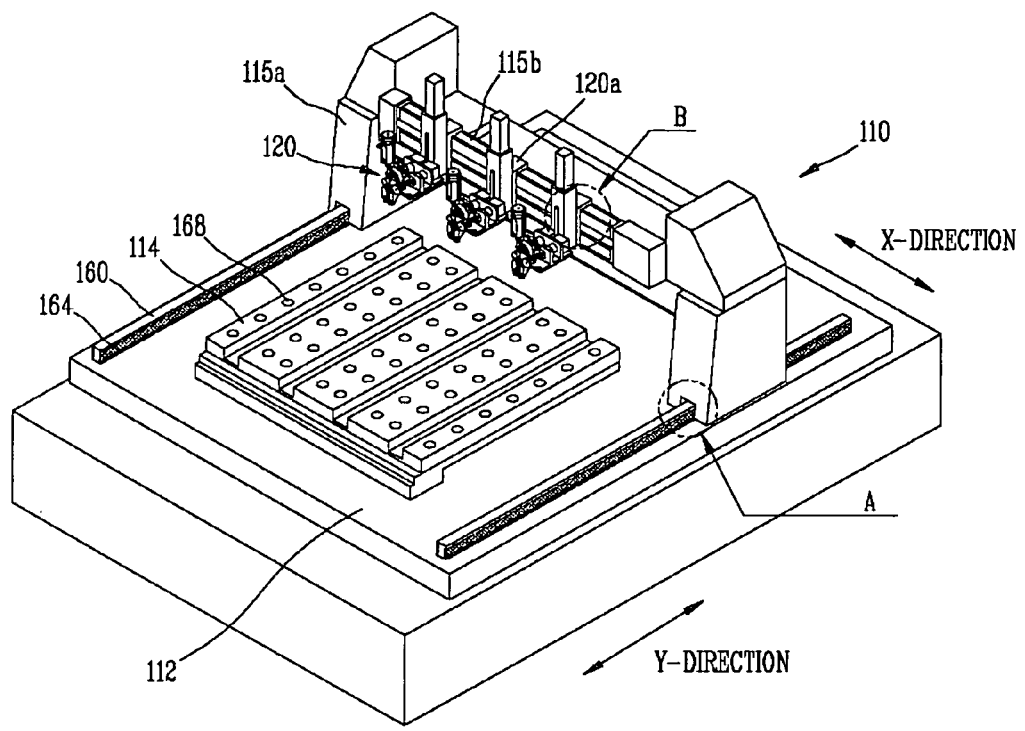
FIG. 13 illustrates a liquid crystal dispensing apparatus according to principles of the present invention.

FIG. 13 illustrates a liquid crystal dispensing apparatus according to principles of the present invention.

Referring to FIG. 13, a liquid crystal dispensing apparatus 110 according to the principles of the present invention may, for example, include a frame 112; a stage 114, coupled to the frame 112, for supporting a base substrate; a guide bar 115b arranged over the stage 114; and at least one liquid crystal dispenser 120 coupled to the guide bar 1115b.

According to principles of the present invention, the number of the liquid crystal dispensers 120 coupled to the guide bar 115b may be varied as desired. For example, the liquid crystal dispensing apparatus 110 may include three liquid crystal dispensers 120 coupled to the guide bar 115b. In another aspect of the present invention, the number of liquid crystal dispensers 120 coupled to the guide bar 115b may correspond to the number of LCD panel regions formed within rows and/or columns on the base substrate.

According to principles of the present invention, the liquid crystal dispensing apparatus 110 may further include at least one guide rail 160 coupled to the frame 112 and a guide bar support 115a coupled to the at least one guide rail 160. In one aspect of the present invention, the guide bar support 115a may be moveably coupled to the at least one guide rail 160. In one aspect of the present invention, the guide bar 115b may be immovably coupled to the guide bar support 115a. In another aspect of the present invention, the guide bar support 115a may moveably coupled to the guide rail 160 via a third motor (e.g., a linear motor), operatively coupled between the guide bar support 115a and the guide rail 160. In still another aspect of the present invention, the guide bar support 115a may, for example, include a groove (shown in greater detail in FIG. 14) that encloses a space around the guide rail 160. Upon operating the third motor, the guide bar support 115a, and, therefore, the guide bar 115b and liquid crystal dispensers 120, may be moved along a first direction (e.g., a y-direction) defined by the guide rail 160.

Figure 14:
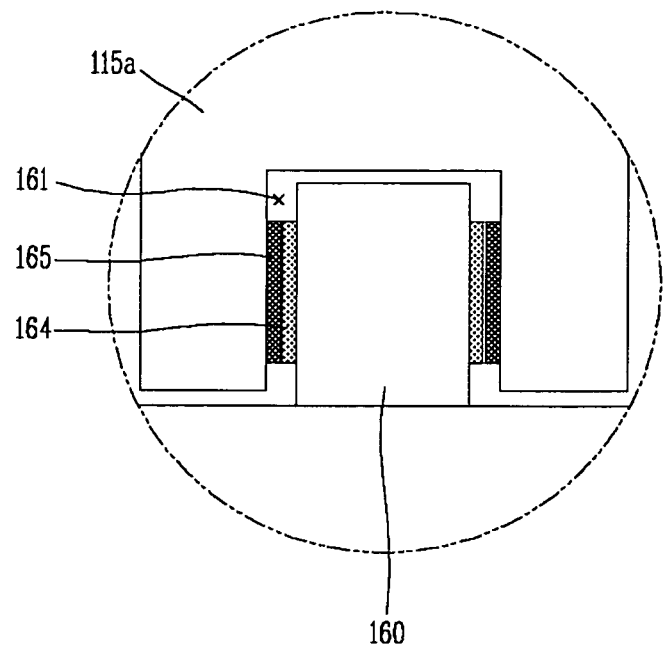
FIG. 14 illustrates an enlarged view of the A-region shown in FIG. 13.

FIG. 14 illustrates an enlarged view of the A-region shown in FIG. 13.

Referring to FIG. 14, the third motor may, for example, include at least one first magnetic bar 164 and at least one second magnetic bar 165 disposed within the space enclosed around the guide rail 160 by the groove 161 of the guide rail support 115a. In one aspect of the present invention, the at least one first magnetic bar 164 may be arranged at a side of the guide rail 160. In another aspect of the present invention, the at least one second magnetic bar 165 may be arranged at a sidewall of the groove 161 so as to be operably proximate to (e.g., directly opposed to) the at least one first magnetic bar 164. In still another aspect of the present invention, the at least one first magnetic bar 164 may comprise a fixed-polarity magnetic bar while the at least one second magnetic bar 165 may comprise a variable-polarity magnetic bar that is coupled to an alternative current source. In yet another aspect of the present invention, the at least one first magnetic bar 164 may comprise a variable-polarity magnetic bar while the at least one second magnetic bar 165 may comprise a fixed-polarity magnetic bar that is coupled to the alternative current source. Depending on the polarity of an alternative current signal applied from the alternative current source to the variable-polarity magnetic bar, an electric field having one of two polarities may be generated between the first and second magnetic bars 164 and 165. Upon generating the electric field, the guide bar support 115$a$ moves along the first direction defined by the guide rail 160. In one aspect of the present invention, the speed at which the guide rail support 115$a$ moves may be controlled by varying the frequency of the alternative current signal applied to the variable-polarity magnetic bar.

Referring back to FIG. 13, and in accordance with principles of the present invention, each of the aforementioned liquid crystal dispensers 120 may be coupled to the guide bar 115$b$ via a liquid crystal dispenser support 120$a$. In one aspect of the present invention, each liquid crystal dispenser support 120$a$ may be moveably coupled to the guide bar 115$b$ via a fourth motor (e.g., a linear motor similar to the third motor described above), operatively coupled between the guide bar 115$b$ and the liquid crystal dispenser support 120$a$. In another aspect of the present invention, each liquid crystal dispenser 120 may be coupled the guide bar 115$b$ by its own liquid crystal dispenser support 120$a$. In still another aspect of the present invention, each liquid crystal dispenser 120 may be coupled the guide bar 115$b$ by a common liquid crystal dispenser support 120$a$. In yet another aspect of the present invention, each liquid crystal dispenser support 120$a$ may be driven identically as, or differently from, any other liquid crystal dispenser support 120$a$. In one aspect of the present invention, the liquid crystal support 120$a$ may, for example, enclose a space around the guide bar 115$b$. Upon operating the fourth motor, the liquid crystal dispenser support 120$a$, and, therefore, the liquid crystal dispenser 120, may be moved along the second direction (e.g., the x-direction) defined by the guide bar 115$b$.

Figure 15:
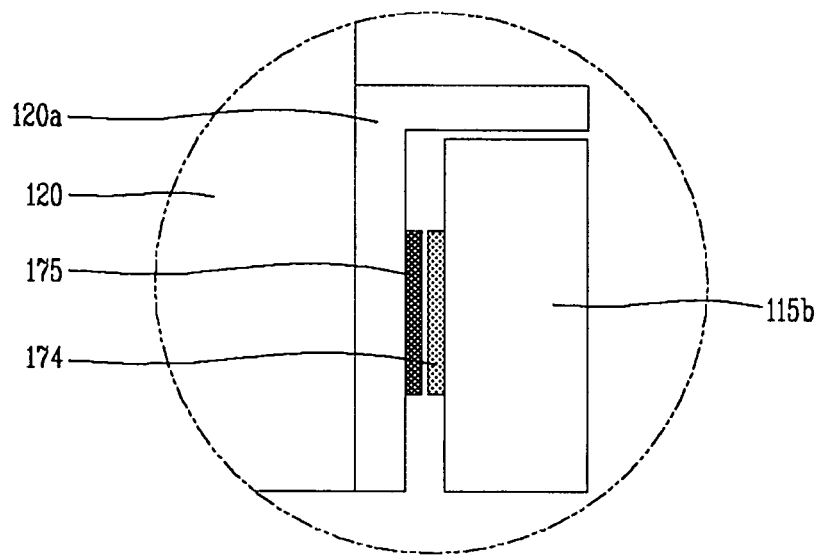
FIG. 15 illustrates an enlarged view of the B-region shown in FIG. 13.

FIG. 15 illustrates an enlarged view of the B-region shown in FIG. 13.

Referring to FIG. 15, the fourth motor may, for example, include at least one third magnetic bar 174 and at least one fourth magnetic bar 175 disposed within the space enclosed around the guide bar 115$b$ by the liquid crystal dispenser support 120$a$. In one aspect of the present invention, the at least one third magnetic bar 174 may be arranged at a side of the guide bar 115$b$. In another aspect of the present invention, the at least one fourth magnetic bar 175 may be arranged at a sidewall of the liquid crystal dispenser support 120$a$ so as to be operably proximate to (e.g., directly opposed to) the at least one third magnetic bar 174. In still another aspect of the present invention, the at least one third magnetic bar 174 may comprise a fixed-polarity magnetic bar while the at least one fourth magnetic bar 175 may comprise a variable-polarity magnetic bar that is coupled to an alternative current source. In yet another aspect of the present invention, the at least one third magnetic bar 174 may comprise a variable-polarity magnetic bar while the at least one fourth magnetic bar 175 may comprise a fixed-polarity magnetic bar that is coupled to the alternative current source. Depending on the polarity of an alternative current signal applied from the alternative current source to the variable-polarity magnetic bar, an electric field having one of two polarities may be generated between the third and fourth magnetic bars 174 and 175. Upon generating the electric field, the liquid crystal dispenser support 120$a$ moves along the second direction defined by the guide bar 115$b$. In one aspect of the present invention, the speed at which the liquid crystal dispenser support 120$a$ moves may be controlled by varying the frequency of the alternative current signal applied to the variable-polarity magnetic bar.

Referring back to FIG. 13, and in accordance with principles of the present invention, a driving means (not shown) may be provided to move the stage 114 along the first and/or second directions. Accordingly, the stage 114 may be moved independently of the guide bar support 115$a$ and/or the guide bar 115$b$. The driving means may be provided as an alternative, or as a supplement, to the aforementioned third and/or fourth motors capable of moving the guide bar and liquid crystal dispenser supports 115$a$ and 120$a$, respectively, along the first and second directions.

According to principles of the present invention, a plurality of suction holes 168 may be defined within an upper surface of the stage 114. In one aspect of the present invention, the suction holes may be in fluid communication with a vacuum pump (not shown) capable of generating a suction force. Accordingly, the suction holes 168 may transmit the generated suction force to a base substrate supported by the stage 114, thereby securing the base substrate to the stage 114. In another aspect of the present invention, electrostatic chucks (not shown) may be disposed within the stage to generate and exert an electrostatic force on a base substrate supported by the stage 114, thereby securing the base substrate to the stage 114. It should be noted that the electrostatic chucks may be provided as an alternative to, or to supplement, the aforementioned suction holes 168.

According to principles of the present invention described above, liquid crystal dispensers 120 may be precisely arranged, along both y- and x-directions, over a base substrate supported by stage 114. Accordingly, the principles of the present invention allow liquid crystal material to be precisely and simultaneously dispensed from the liquid crystal dispensers 120 onto a plurality of LCD panel regions formed on the same base substrate. Moreover, the principles of the present invention may be extended to the dispensing of liquid crystal material onto LCD panel regions of different sizes on the same base substrate. By dispensing liquid crystal material on variously-sized LCD panel regions, LCD panels of multiple sizes may be simultaneously fabricated from the same base substrate, the efficiency with which the base substrate may be increased, and the cost and time required to fabricate individual LCD panels may be reduced. Thus, the principles of the present invention may be applied to the simultaneous fabrication of LCD panels employed in mobile electronic devices (e.g., mobile phones, notebook computers, etc.) but also to other electronic devices (e.g., monitors, televisions, etc).

Figure 16:
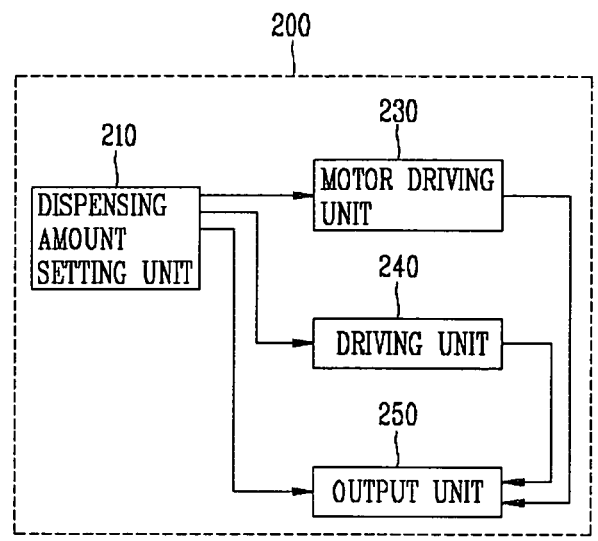
FIG. 16 illustrates an exemplary block diagram of a control unit of the liquid crystal dispensing apparatus according to principles of the present invention.

FIG. 16 illustrates a block diagram of a control unit of the liquid crystal dispensing apparatus according to principles of the present invention.

According to principles of the present invention, the first to fourth motors may, for example, be independently driven by a control unit. In another aspect of the present invention, the control unit may also, for example, calculate an amount of liquid crystal material to be dispensed (e.g., within a single liquid crystal droplet and/or onto an entire LCD panel region). In still another aspect of the present invention, the control unit may also, for example, calculate positions at which the liquid crystal material is to be dispensed onto each LCD panel region. Accordingly, the control unit may control the liquid crystal dispensing apparatus 110 to dispense a predetermined pattern of liquid crystal droplets onto each LCD panel region.

Referring to FIG. 16, such a control unit 200 may, for example, include a dispensing amount setting unit 210 for calculating and setting an amount of liquid crystal to be dispensed as a single liquid crystal droplet and/or onto an LCD panel region (i.e., a droplet amount) and for calculating and setting positions on the LCD panel region where liquid crystal material is to be dispensed (i.e., liquid crystal dispensing positions), a motor driving unit 230 for controlling the aforementioned first and second motors 131 and 133 to dispense the calculated amount of liquid crystal material; a driving unit 240 for aligning the nozzle 150 with a liquid crystal material dispensing position on the LCD panel region by, for example, moving the stage 114 and/or the guide bar support 115a along the first direction and by, for example, moving the stage 114 and/or liquid crystal dispenser support 120a along the second direction; and an outputting unit 250 for communicating predetermined information (e.g., base substrate size, LCD panel region size, calculated amount of liquid crystal material to dispense, current amount of liquid crystal material dispensed, dispensing positions, etc.) to an operator and for communicating an alarm to the operator when an unacceptable event occurs during operation.

In one aspect of the present invention, the outputting unit 250 may, for example, include a cathode ray tube (CRT), an LCD device, a printer, etc., to communicate predetermined information and alarm to the operator.

In one aspect of the present invention, the droplet amount may be pre-calculated and input into the dispensing amount setting unit 210 by the operator. In another aspect of the present invention, the droplet amount may be calculated by the dispensing amount setting unit 210 and be subsequently modified by the operator. In still another aspect of the present invention, the droplet amount may be precisely calculated by the dispensing amount setting unit 210 based on, for example, the size of the LCD panel region, the number of LCD panel regions formed on the same base substrate, a cell gap of an LCD panel formed using the LCD panel region, height of spacers formed within an LCD panel formed using the LCD panel region, viscosity of liquid crystal dispensed, etc.

Figure 17:
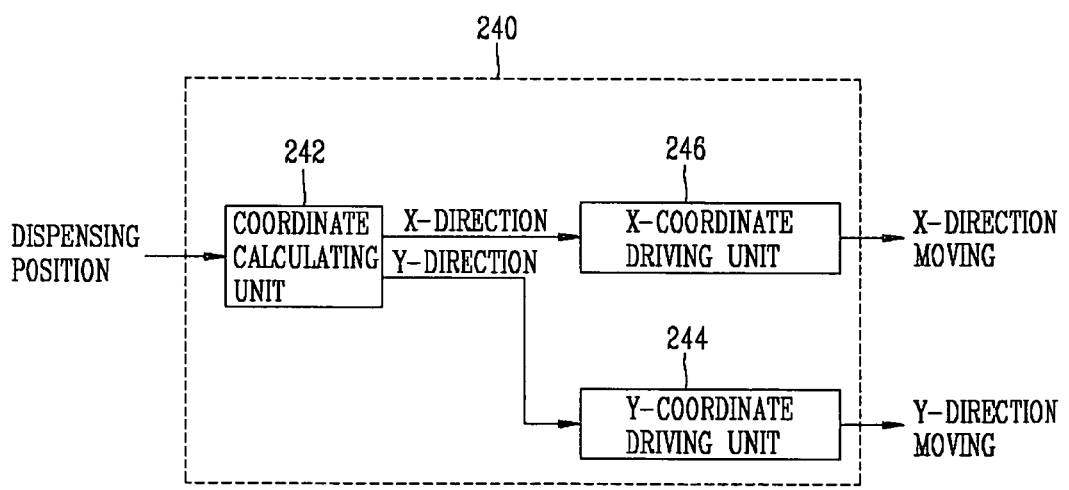
FIG. 17 illustrates an exemplary block diagram of a driving unit of the liquid crystal dispensing apparatus according to principles of the present invention.

FIG. 17 illustrates a block diagram of a driving unit of the liquid crystal dispensing apparatus according to principles of the present invention.

Referring to FIG. 17, the driving unit 240 may, for example, include a coordinate calculating unit 242 for receiving a dispensing position set by the dispensing amount setting unit 210 and for calculating x- and y-coordinates of dispensing positions onto which single amounts of liquid crystal material are to be dispensed as liquid crystal droplets, a y-coordinate driving unit 244 for driving the third motor and/or the driving means and aligning the nozzle 150 to the calculated y-coordinate, and an x-coordinate driving unit 246 for driving the fourth motor and/or the driving means and aligning the nozzle 150 to the calculated x-coordinate.

After the x- and y-coordinate driving units 246 and 244 are appropriately driven according to the coordinate calculating unit 242, the motor driving unit 230 may drive the first motor 131 to dispense liquid crystal material onto the LCD panel region at the calculated x- and y-coordinates.

As discussed above with respect to FIG. 13, the liquid crystal dispensing apparatus 110 may be provided one guide bar support 115a and one guide bar 115b. It will be readily appreciated, however, that any desired number of guide bar supports 115a and guide bars 115 may be incorporated within the liquid crystal dispensing apparatus 110. For example, one, two, or more than two guide bar supports 115a and/or guide bars 115 may be incorporated within the liquid crystal dispensing apparatus 110.

Figure 18:
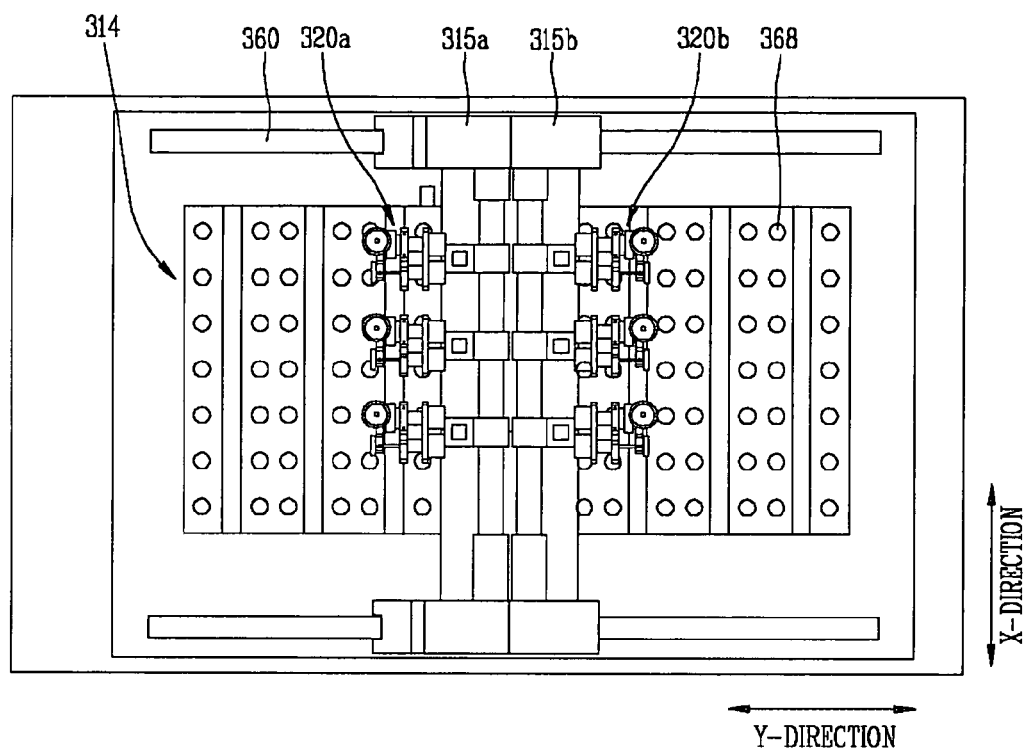
FIG. 18 illustrates a plan view of the liquid crystal dispensing apparatus according to principles of the present invention.

FIG. 18 illustrates a plan view of the liquid crystal dispensing apparatus according to principles of the present invention.

Referring to FIG. 18, a liquid crystal dispensing apparatus may, for example, include first and second pairs of guide bar supports and guide bars, each pair collectively referred to herein as first and second guide bar assemblies 315a and 315b, respectively. First and second groups of liquid crystal dispensers 320a and 320b, respectively, may be coupled to respective ones of the first and second guide bar assemblies 315a and 315b, respectively. According to principles of the present invention, each group of liquid crystal dispensers and guide bar assembly may be independently driven and aligned to desired x- and y-coordinates substantially as described above with respect to the liquid crystal dispensing apparatus shown in FIG. 13. For example, the first and second guide bar assemblies 315a and 315b may be driven and aligned along at least one guide rail 360 to their respective y-coordinates and the first and second groups of liquid crystal dispensers 320a and 320b may be driven and aligned to their respective x-coordinates. Alternatively or supplementarily, the stage 314 may be driven and aligned to the x- and y-coordinates.

According to principles of the present invention, the liquid crystal dispensing apparatus illustrated in FIG. 18 may, if desired, be used to dispense liquid crystal material on a large base substrate. Moreover, the liquid crystal dispensing apparatus illustrated in FIG. 18 may, if desired, be used to dispense liquid crystal material on two or more smaller base substrates simultaneously supported by the stage 114. In this case, different portions of the stage 114 may be independently driven and aligned to desired x- and y-coordinates.

Figure 19:
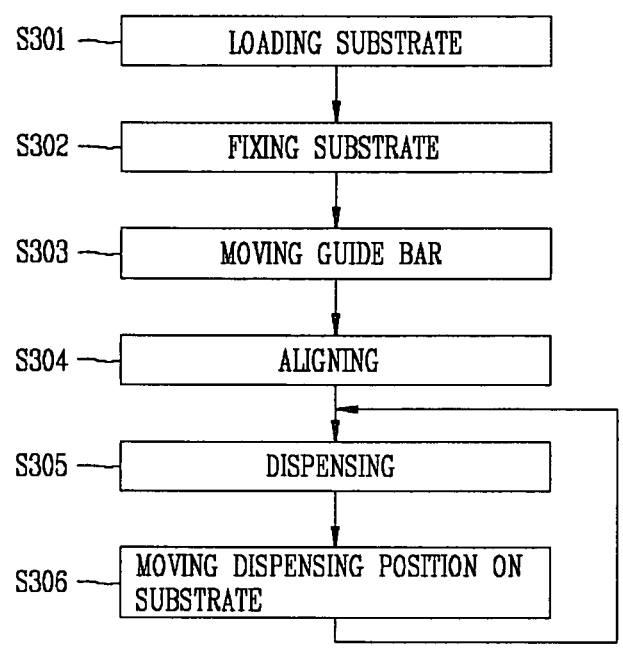
FIG. 19 illustrates a flow chart of a liquid crystal dispensing method using the liquid crystal dispensing apparatus according to principles of the present invention.

FIG. 19 illustrates a flow chart of a liquid crystal dispensing method using the liquid crystal dispensing apparatus according to principles of the present invention.

The liquid crystal dispensing method discussed with respect to FIG. 19 is exemplarily applied to the liquid crystal dispensing apparatus shown in FIG. 18. It will be appreciated, however, that the method described below may easily be applied to any liquid crystal dispensing apparatus provided in accordance with the principles of the present invention.

Referring to FIG. 19, at step S301, a substrate may be loaded onto the stage 314 by a loading device such as a robot arm, or the like. In one aspect of the present invention, the substrate may be loaded onto the stage 314 such that it is aligned to a predetermined position on the stage 314. After the substrate is loaded, the first and second guide bars assemblies 315a and 315b may be driven in opposing direction along the y-direction to first and second standby areas, respectively, arranged at opposing edge regions of the stage 314, wherein the loaded substrate is arranged between the first and second standby areas.

At step S302, the loaded substrate may be secured to the stage 314 via a vacuum suction force transmitted by the suction holes 268 and/or electrostatic force transmitted by the electrostatic chucks (not shown).

At step S303, the first and second guide bar assemblies 315a and 315b may be driven to move along the y-direction from respective ones of the first and second standby areas toward a central area of the stage 314. At step S304, the first and second groups of liquid crystal dispensers 320a and 320b may be driven and aligned along the x-direction to align nozzles of the first and second groups of liquid crystal dispensers 320a and 320b with initial dispensing positions on the base substrate. If desired, the stage 314 may be driven and aligned to x/ and/or y-coordinates to align the nozzles with the initial dispensing positions.

At step S305, after the nozzles are aligned to the initial dispensing positions, the discharge pumps of the first and second groups of liquid crystal dispensers 320a and 320b may be driven to dispense liquid crystal material onto the base substrate.

At step S306, after initial liquid crystal droplets have been dispensed onto the base substrate, the first and second groups of liquid crystal dispensers 320a and 320b and/or the first and second guide bar assemblies 315a and 315b and/or the stage

314 may be driven and aligned along x- and y-coordinates to dispense liquid crystal material at a next dispensing position. Steps S305 and S306 may be repeated until a desired amount of liquid crystal material has been dispensed onto the base substrate. After the desired amount of liquid crystal material has been dispensed onto the base substrate, the first and second guide bar assemblies 315a and 315b may be driven and moved back to the first and second standby areas, respectively, and the base substrate may be unloaded from the substrate 314.

As described above, the principles of the present invention enable a liquid crystal dispenser to be driven and aligned over a specific location on a base substrate where liquid crystal material is to be dispensed. Once aligned, the liquid crystal dispenser may be operated to quickly and precisely dispense liquid crystal droplets, each containing a specific amount of liquid crystal material, onto the base substrate at the specific location.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of dispensing liquid crystal material, comprising:
   loading a substrate having a plurality of unit panels onto a stage;
   aligning a plurality of liquid crystal dispensers to the unit panels on the substrate, wherein a plurality of liquid crystal dispensers are coupled to a guide bar arranged over the substrate and wherein the aligning includes moving at least one of:
      the guide bar along a first direction over the loaded substrate, and
      the plurality of liquid crystal dispensers installed movably at the guide bar along a second direction over the loaded substrate, wherein the second direction is substantially perpendicular to the first direction;
   dispensing liquid crystal material from the plurality of liquid crystal dispensers onto the plurality of unit panels of the substrate by moving respectively the guide bar and the plurality of liquid crystal dispensers in the perpendicular direction each other; and
   unloading the substrate having the liquid crystal material dispensed thereon from the stage,
   wherein the liquid crystal dispensers include a liquid crystal material container for containing the liquid crystal material, a cylinder having a suction opening and a discharge opening, a piston rotatably arranged within the cylinder to draw the liquid crystal material in through the suction opening from the liquid crystal material container and for discharging the liquid crystal material out through the discharge opening, wherein the piston is fixed to a rotating member, and wherein the piston rotates within an interior space of the cylinder as the rotating member is rotated by a first motor to control a dispensed amount of the liquid crystal material, a groove arranged at a center region of a lower portion of the piston, a pad at the lower portion of the liquid crystal material container, a connecting tube having one end portion inserted to the suction opening of the cylinder, a pin formed at other end of the connection tube to be inserted to the pad for drawing the liquid crystal material from the liquid crystal material container to the cylinder therethrough, a bar-shaped member having a first end contacting the cylinder, and a second end connected to a rotational shaft connected to a second motor, wherein rotating the rotational shaft rotates the second end of the bar-shaped member along a linear axis of the rotational shaft to control a fixation angle between the cylinder and the rotating member, and a nozzle in fluid communication with the discharge pump for dispensing the discharged liquid crystal material,
   wherein the guide bar is moved in the second direction along a guide rail on the stage and the liquid crystal dispensers are moved along the guide bar so that the liquid crystal dispensers are respectively disposed at the dispensing positions,
   wherein the guide bar is moved by a third motor disposed to the guide bar and the plurality of liquid crystal dispensers are independently driven along one guide bar by a plurality of fourth motors disposed respectively to each liquid crystal dispenser.

2. The method of claim 1, wherein a plurality of liquid crystal dispensers are moveably coupled to the guide bar.

3. The method of claim 1, further comprising, before loading the substrate, moving the guide bar to a standby area at an edge region of the stage.

4. The method of claim 1, further comprising, after dispensing the liquid crystal material, moving the guide bar to a standby area at an edge region of the stage.

5. The method of claim 1, wherein loading the substrate includes aligning the substrate with respect to the stage.

6. A method of dispensing liquid crystal material, comprising:
   loading a substrate having a plurality of unit panels onto a stage;
   aligning a plurality of liquid crystal dispensers to the unit panels on the substrate, wherein a plurality of liquid crystal dispensers are coupled to a guide bar arranged over the substrate and wherein the aligning includes moving at least one of:
   the guide bar along a first direction over the loaded substrate, and
   the plurality of liquid crystal dispensers installed movably at the guide bar along a second direction over the loaded substrate, wherein the second direction is substantially perpendicular to the first direction;
   dispensing liquid crystal material from the plurality of liquid crystal dispensers onto the plurality of unit panels of the substrate by moving respectively the guide bar and the plurality of liquid crystal dispensers in the perpendicular direction each other;
   unloading the substrate having the liquid crystal material dispensed thereon from the stage, wherein the liquid crystal dispensers include a liquid crystal material container for containing the liquid crystal material, a cylinder having a suction opening and a discharge opening, a piston rotatable arranged within the cylinder to draw the liquid crystal material in through the suction opening from the liquid crystal material container and for discharging the liquid crystal material out through the discharge opening, wherein the piston is fixed to a rotating member, and wherein the piston rotates within an interior space of the cylinder as the rotating member is rotated by a first motor to control a dispensed amount of the liquid crystal material, a groove arranged at a center region of a lower portion of the piston, a pad at the lower portion of the liquid crystal material container, a connecting tube having one end portion inserted to the suction opening of the cylinder, a pin formed at other end of the connection tube to be inserted to the pad for drawing the liquid crystal material from the liquid crystal material container to the cylinder therethrough, a bar-shaped member having a first end contacting the cylinder, and a second end connected to a rotational shaft connected to a second motor, wherein rotating the rotational shaft rotates the second end of the bar-shaped member along a linear axis of the rotational shaft to control a fixation angle between the cylinder and the rotating member, and a nozzle in fluid communication with the discharge pump for dispensing the discharged liquid crystal material, wherein the guide bar is moved in the second direction along a guide rail on the stage and the liquid crystal dispensers are moved along the guide bar so that the liquid crystal dispensers are respectively disposed at the dispensing positions, wherein the guide bar is moved by a third motor disposed to the guide bar and the plurality of liquid crystal dispensers are independently driven along one guide bar by a plurality of fourth motors disposed respectively to each liquid crystal dispenser; and further comprising securing the loaded substrate to the stage, wherein the securing includes transmitting a vacuum suction force to the loaded substrate.

7. The method claim 6, wherein the securing includes transmitting an electrostatic force to the loaded substrate.

8. The method of claim 1, wherein the aligning further includes moving the stage having the substrate loaded thereon.

9. The method of claim 8, wherein moving the stage includes moving the stage along the first direction.

10. The method of claim 8, wherein moving the stage includes moving the stage along the second direction.

11. The method of claim 1, wherein the aligning further includes moving the stage having the substrate loaded thereon.

12. The method of claim 11, wherein moving the stage includes moving the stage along the first direction.

13. The method of claim 11, wherein moving the stage includes moving the stage along the second direction.

14. The method of claim 1, wherein the aligning further includes moving the stage having the substrate loaded thereon.

15. The method of claim 14, wherein moving the stage includes moving the stage along the first direction.

16. The method of claim 14, wherein moving the stage includes moving the stage along the second direction.

17. The method of claim 1, wherein the aligning includes separately moving the guide bar and at least one liquid crystal dispenser.

18. The method of claim 17, wherein the aligning includes moving the stage having the substrate loaded thereon.

19. The method of claim 18, wherein moving the stage includes moving the stage along the first direction.

20. The method of claim 18, wherein moving the stage includes moving the stage along the second direction.

21. The method of claim 1, further including repeatedly and sequentially aligning a plurality of liquid crystal dispensers over the substrate and dispensing liquid crystal material from a plurality of liquid crystal dispensers onto the stage.

22. The method of claim 1, further including repeatedly and sequentially moving the stage having the substrate loaded thereon and dispensing liquid crystal material from the aligned at least one liquid crystal dispenser onto the stage.

23. The method of claim 1, further including dispensing liquid crystal material from a plurality of liquid crystal dispensers onto the stage while aligning a plurality of liquid crystal dispensers.

24. The method of claim 23, further including dispensing liquid crystal material from the at least one liquid crystal dispenser onto the stage while moving the guide bar.

25. The method of claim 24, further including dispensing liquid crystal material from the at least one liquid crystal dispenser onto the stage while moving the substrate having the substrate loaded thereon.

26. The method of claim 23, further including dispensing liquid crystal material from the at least one liquid crystal dispenser onto the stage while moving the guide bar support.

27. The method of claim 26, further including dispensing liquid crystal material from the at least one liquid crystal dispenser onto the stage while moving the substrate having the substrate loaded thereon.

28. The method of claim 1, wherein dispensing liquid crystal material from the at least one liquid crystal dispenser includes:

drawing liquid crystal material into a discharge pump; and discharging the drawn-in liquid crystal material from the discharge pump through a nozzle.

29. A method of dispensing liquid crystal material, comprising:

loading a substrate having a plurality of unit panels onto a stage;

aligning a plurality of liquid crystal dispensers to the unit panels on the substrate, wherein a plurality of liquid crystal dispensers are coupled to a guide bar arranged over the substrate and wherein the aligning includes moving at least one of:

the guide bar along a first direction over the loaded substrate, and the plurality of liquid crystal dispensers installed movably at the guide bar along a second direction over the loaded substrate, wherein the second direction is substantially perpendicular to the first direction;

dispensing liquid crystal material from the plurality of liquid crystal dispensers onto the plurality of unit panels of the substrate by moving respectively the guide bar and the plurality of liquid crystal dispensers in the perpendicular direction each other;

unloading the substrate having the liquid crystal material dispensed thereon from the stage, wherein the liquid crystal dispensers include a liquid crystal material container for containing the liquid crystal material, a cylinder having a suction opening and a discharge opening, a piston rotatable arranged within the cylinder to draw the liquid crystal material in through the suction opening from the liquid crystal material container and for discharging the liquid crystal material out through the discharge opening, wherein the piston is fixed to a rotating member, and wherein the piston rotates within an interior space of the cylinder as the rotating member is rotated by a first motor to control a dispensed amount of the liquid crystal material, a groove arranged at a center region of a lower portion of the piston, a pad at the lower portion of the liquid crystal material container, a connecting tube having one end portion inserted to the suction opening of the cylinder, a pin formed at other end of the connection tube to be inserted to the pad for drawing the liquid crystal material from the liquid crystal material container to the cylinder therethrough, a bar-shaped member having a first end contacting the cylinder, and a second end connected to a rotational shaft connected to a second motor, wherein rotating the rotational shaft rotates the second end of the bar-shaped member along a linear axis of the rotational shaft to control a fixation angle between the cylinder and the rotating member, and a nozzle in fluid communication with the discharge pump for dispensing the discharged liquid crystal material, wherein the guide bar is moved in the second direction along a guide rail on the stage and the liquid crystal dispensers are moved along the guide bar so that the liquid crystal dispensers are respectively disposed at the dispensing positions, wherein the guide bar is moved by a third motor disposed to the guide bar and the plurality of liquid crystal dispensers are independently driven along one guide bar by a plurality of fourth motors disposed respectively to each liquid crystal dispenser; and further comprising cleaning a nozzle of at least one liquid crystal dispenser, wherein the cleaning includes blowing a gas against the surface of the nozzle.

* * * * *